(12) United States Patent
Fang et al.

(10) Patent No.: US 12,009,004 B2
(45) Date of Patent: Jun. 11, 2024

(54) SPEECH ENHANCEMENT METHOD AND APPARATUS, ELECTRONIC DEVICE, AND COMPUTER-READABLE STORAGE MEDIUM

(71) Applicant: Tencent Technology (Shenzhen) Company Limited, Guangdong (CN)

(72) Inventors: Xuefei Fang, Shenzhen (CN); Xiaochun Cui, Shenzhen (CN); Congbing Li, Shenzhen (CN); Xiaoyu Liu, Shenzhen (CN); Muyong Cao, Shenzhen (CN); Tao Yu, Shenzhen (CN); Dong Yang, Shenzhen (CN); Rongxin Zhou, Shenzhen (CN); Wenyan Li, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 278 days.

(21) Appl. No.: 17/717,620

(22) Filed: Apr. 11, 2022

(65) Prior Publication Data
US 2022/0262386 A1    Aug. 18, 2022

Related U.S. Application Data

(63) Continuation of application No. PCT/CN2020/126345, filed on Nov. 4, 2020.

(30) Foreign Application Priority Data

Feb. 10, 2020    (CN) .......................... 202010085323.0

(51) Int. Cl.
*G10L 21/00* (2013.01)
*G06N 3/04* (2023.01)
(Continued)

(52) U.S. Cl.
CPC ............ *G10L 21/0232* (2013.01); *G06N 3/08* (2013.01); *G10L 25/18* (2013.01); *G10L 25/30* (2013.01)

(58) Field of Classification Search
None
See application file for complete search history.

(56) References Cited

U.S. PATENT DOCUMENTS

2016/0203828 A1* 7/2016 Gomez ................... G10L 15/20
    704/226
2018/0260709 A1    9/2018 Zhang et al.

FOREIGN PATENT DOCUMENTS

| CN | 103413551 A | 11/2013 |
|---|---|---|
| CN | 103559888 A | 2/2014 |

(Continued)

OTHER PUBLICATIONS

J. Zhao and L. Jiao, "Fast Sparse Deep Neural Networks: Theory and Performance Analysis," in IEEE Access, vol. 7, pp. 74040-74055, Jun. 4, 2019 (Year: 2019).*

(Continued)

*Primary Examiner* — Shreyans A Patel
(74) *Attorney, Agent, or Firm* — Crowell & Moring LLP

(57) ABSTRACT

Embodiments of this disclosure provide a speech enhancement method and apparatus, an electronic device, and a computer-readable storage medium. The method includes: obtaining a clean speech sample; decomposing the clean speech sample to obtain a first sparse matrix and m base matrices, values in the first sparse matrix being all positive numbers, and m being a positive integer greater than 1; obtaining, according to the first sparse matrix and a weight matrix of a target neural network, state vectors of neurons in a visible layer of the target neural network; and updating the weight matrix according to the state vectors of the neurons (Continued)

in the visible layer and the clean speech sample, to obtain a deep dictionary used for speech enhancement.

20 Claims, 11 Drawing Sheets

(51) Int. Cl.
 *G06N 3/08* (2023.01)
 *G10L 21/0232* (2013.01)
 *G10L 25/18* (2013.01)
 *G10L 25/30* (2013.01)

(56) References Cited

FOREIGN PATENT DOCUMENTS

| | | | | |
|---|---|---|---|---|
| CN | 108322858 | A | | 7/2018 |
| CN | 108615533 | A | | 10/2018 |
| CN | 108899045 | A | | 11/2018 |
| CN | 108986834 | A | | 12/2018 |
| CN | 109087664 | A | | 12/2018 |
| CN | 110164465 | A | | 8/2019 |
| CN | 110189761 | A | | 8/2019 |
| CN | 110189761 | A | * 8/2019 | ......... G10L 21/0208 |
| CN | 110634502 | A | | 12/2019 |
| CN | 111312270 | A | | 6/2020 |
| CN | 110189761 | B | * 3/2021 | ......... G10L 21/0208 |
| CN | 112712096 | A | * 4/2021 | |
| JP | 6220701 | B2 | | 10/2017 |
| JP | 2021516786 | A | * 7/2021 | |
| WO | WO 2015/060375 | A1 | | 4/2015 |

OTHER PUBLICATIONS

International Search Report for priority application No. PCT/CN2020/126345 dated Jan. 29, 2021, 5p, in Chinese language.
English translation of the International Search Report for priority application No. PCT/CN2020/126345 dated Jan. 29, 2021, 3p.
Written Opinion for priority application No. PCT/CN2020/126345 dated Jan. 24, 2021, 4p.
Xu, Genpeng, "Dictionary Learning Algorithms and Its Application in Speech Enhancement," *Guangdong University of Technology Master's Theses*, May 2017, 84p.
English Abstract of A16.
Concie Explanation of relevancy for A15.
Extended European Search Report for corresponding application No. EP 20918152.8 dated Oct. 13, 2022, 28p.
Hsu, Chung-Chien et al., "Layered Nonnegative Matrix Factorization for Speech Separation", *Interspeech* (ISCA), Sep. 10, 2015, pp. 628-623, DE.
Tariyal, Snigdha et al., "Deep Dictionary Learning", *IEEE Access*, Jul. 26, 2016, vol. 4, pp. 10096-10109, IN.
Trigeorgis, George et al., "A Deep Semi-NMF Model for Learning Hidden Representations", *Proceedings of the 31st International Conference on Machine Learning*, Jun. 22, 2014, vol. 32, pp. 1692-1700, CN.
Tseng, Hung-Wei et al., "Combining sparse NMF with deep neural network: A new classification-based approach for speech enhancement", *IEEE International Conference on Acoustics, Speech and signal Processing (ICASSP)*, IEEE, Apr. 19, 2015, pp. 2145-2149, US.
Office Action and Chinese Search Report for application No. CN 202010085323.0 dated Sep. 21, 2022, 5p., in Chinese language.
Concise Explanation of Relevancy for B2.

* cited by examiner

SPEECH ENHANCEMENT METHOD AND APPARATUS, ELECTRONIC DEVICE, AND COMPUTER-READABLE STORAGE MEDIUM

RELATED APPLICATION

This application is a continuation application of International Application No. PCT/CN2020/126345, filed Nov. 4, 2020, which claims priority to Chinese Patent Application No. 202010085323.0, entitled "SPEECH ENHANCEMENT METHOD AND APPARATUS, ELECTRONIC DEVICE, AND COMPUTER-READABLE STORAGE MEDIUM" and filed on Feb. 10, 2020. The both applications are incorporated by reference in their entireties.

TECHNICAL FIELD

This disclosure relates to the field of speech noise cancellation technologies, and in particular, to a speech enhancement method and apparatus, an electronic device, and a non-transitory computer-readable storage medium.

BACKGROUND

Speech is one of the most convenient and natural communication tools of humans. Speech can both eliminate the gap of communication between people and improve the efficiency of interaction between human and machine. However, in the real world, ubiquitous noise affects the quality of speech communication to different extents. For example, in rich game scenes, when a user makes a game voice call in a noisy environment, the microphone may acquire various environmental noise. In addition, in a multi-player group voice call, if one member is interfered with noise, the call quality of members in the entire group will be impacted.

A conventional speech noise cancellation algorithm is based on statistical analysis, in which it is assumed that noise signals change slowly relative to speech. However, due to the richness of noise in a complex environment, when the assumption does not conform to the actual situation, the algorithm cannot provide an expected effect.

SUMMARY

Embodiments of this disclosure provide a speech enhancement method and apparatus, an electronic device, and a computer-readable storage medium. A deep dictionary that can represent the deep feature of clean speech can be provided to better perform speech enhancement on noisy speech.

The embodiments of this disclosure provide a speech enhancement method. The method includes: obtaining a clean speech sample; decomposing the clean speech sample to obtain a first sparse matrix and m base matrices, values in the first sparse matrix being all positive numbers, and m being a positive integer greater than 1; obtaining, according to the first sparse matrix and a weight matrix of a target neural network, state vectors of neurons in a visible layer of the target neural network; and updating the weight matrix according to the state vectors of the neurons in the visible layer and the clean speech sample, to obtain a deep dictionary used for speech enhancement.

The embodiments of this disclosure provide another speech enhancement method. The speech enhancement method includes: obtaining to-be-enhanced speech; obtaining, by using any one of the foregoing methods, a deep dictionary used for speech enhancement; performing deep expansion on the to-be-enhanced speech according to the deep dictionary, to determine a second sparse matrix of the to-be-enhanced speech; and determining clean speech of the to-be-enhanced speech according to the second sparse matrix and the deep dictionary.

The embodiments of this disclosure further provide a speech enhancement apparatus. The speech enhancement apparatus includes: a sample obtaining module, a decomposition module, a visible layer reconstruction module, and a deep dictionary obtaining module.

The sample obtaining module may be configured to obtain a clean speech sample. The decomposition module may be configured to decompose the clean speech sample to obtain a first sparse matrix and m base matrices, values in the first sparse matrix being all positive numbers, and m being a positive integer greater than 1. The visible layer reconstruction module may be configured to obtain, according to the first sparse matrix and a weight matrix of a target neural network, state vectors of neurons in a visible layer of the target neural network. The deep dictionary obtaining module may be configured to update the weight matrix according to the state vectors of the neurons in the visible layer and the clean speech sample, to obtain a deep dictionary used for speech enhancement.

The embodiments of this disclosure further provide an electronic device. The electronic device includes: one or more processors; and a memory, configured to store one or more programs, the one or more programs, when executed by the one or more processors, causing the one or more processors to implement any one of the foregoing speech enhancement methods.

The embodiments of this disclosure further provide a computer-readable storage medium, storing a computer program, the program, when executed by a processor, implementing any one of the foregoing speech enhancement methods.

By using the speech enhancement method and apparatus, the electronic device, and the computer-readable storage medium provided in the embodiments of this disclosure, a first sparse matrix that can represent clean speech briefly as much as possible is obtained through deep decomposition on the clean speech. The first sparse matrix is then introduced into the hidden layer of a target neural network, to complete training of the target neural network, thereby obtaining a deep dictionary that can represent deep information of clean speech signals. On one hand, compared with the related art in which a neural network is trained to determine a mapping relationship between noisy signals and clean signals, the present solution can complete obtaining of a deep dictionary in the speech enhancement technology with clean speech signals only, which has a better generalization ability. On the other hand, in the technical solution provided in this disclosure, the deep dictionary that can represent the deep features of the clean speech signals is obtained through the decomposition on the clean speech, and deeper representation of the clean speech can be learned.

DESCRIPTION OF EMBODIMENTS

Figure 1:
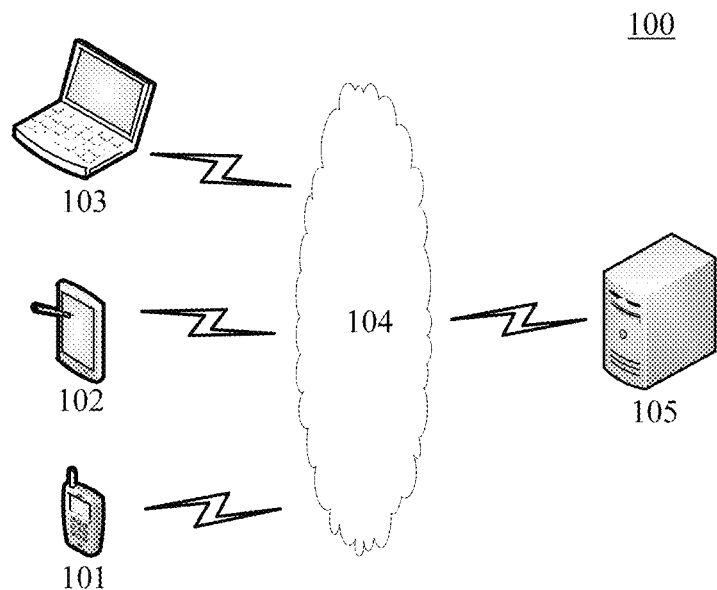
FIG. 1 is a schematic diagram of a system architecture of a speech enhancement system according to an embodiment of this disclosure.

At present, the exemplary embodiments are described comprehensively with reference to the accompanying drawings. However, the exemplary embodiments may be implemented in various forms and are not to be understood as limited to the embodiments described herein; on the contrary, providing these embodiments will make this disclosure more comprehensive and complete, and comprehensively convey the concept of the exemplary embodiments to a person skilled in the art. A same reference numeral in the accompanying drawings represents same or similar components, and therefore repeated descriptions of the components are appropriately omitted.

The features, structures, or characteristics described in this disclosure may be combined in one or more implementations in any appropriate manner. In the following description, many specific details are provided to give a full understanding of the implementations of this disclosure. However, it is to be appreciated by a person skilled in the art that one or more of the specific details may be omitted during practice of the technical solutions of this disclosure, or other methods, components, apparatuses, steps, or the like may be used. In other cases, well-known methods, apparatuses, implementations, or operations are not shown or described in detail, in order not to obscure the aspects of this disclosure.

The accompanying drawings are merely schematic illustrations of this disclosure. The same reference numbers in the accompanying drawings represent the same or similar parts, and therefore, repeated descriptions thereof are omitted. Some of the block diagrams shown in the accompanying drawings do not necessarily correspond to physically or logically independent entities. The functional entities may be implemented in the form of software, or implemented in one or more hardware modules or integrated circuits, or implemented in different networks and/or processor apparatuses and/or micro-controller apparatuses.

The flowcharts shown in the accompanying drawings are merely examples for descriptions, do not necessarily include all content and steps, and are not necessarily performed in the described orders. For example, some steps may further be decomposed, and some steps may be merged or partially merged. As a result, an actual execution order may be changed according to an actual situation.

In this specification, words such as "one", "a/an", "the", and "at least one" are used to indicate the presence of one or more elements/components or the like; words such as "contain", "comprise", and "include" are used in an opened inclusive sense and mean that additional elements/components or the like may further exist apart from the elements/components or the like listed; and words such as "first", "second", "third", or the like are used merely as markers, and do not constitute quantitative restrictions on the objects thereof.

The following describes the exemplary implementations of this disclosure in detail with reference to the accompanying drawings.

FIG. 1 is a schematic diagram of a system architecture 100 of a speech enhancement system according to an embodiment of this disclosure.

As shown in FIG. 1, the system architecture 100 may include terminal devices 101, 102, and 103, a network 104, and a server 105. The network 104 is a medium configured to provide a communication link between the terminal devices 101, 102, and 103 and the server 105. The network 104 may include various connection types, for example, a wired or wireless communication link, or an optical fiber cable.

A user may use the terminal devices 101, 102, and 103 to interact with the server 105 via the network 104 to receive or send messages or the like. The terminal devices 101, 102 and 103 may be various electronic devices with a display screen and supporting web browsing, including, but not limited to, smartphones, tablets, laptops, desktop computers, wearable devices, virtual reality devices, smart homes, or the like.

The server 105 may be a server providing various services, for example, a backend administration server supporting apparatuses operated by the user with the terminal devices 101, 102 and 103. The backend administration server may analyze data such as a received request, and feed back processing results to the terminal devices.

The server 105 may, for example, obtain a clean speech sample; decompose the clean speech sample to obtain a first sparse matrix and m base matrices, values in the first sparse matrix being all positive numbers, and m being a positive integer greater than 1; obtain, according to the first sparse matrix and a weight matrix of a target neural network, state vectors of neurons in a visible layer of the target neural network; and update the weight matrix according to the state vectors of the neurons in the visible layer and the clean speech sample, to obtain a deep dictionary used for speech enhancement.

It is to be understood that the quantities of the terminal devices, network, and server shown in FIG. 1 are merely illustrative. The server 105 may be an entity server, for example, an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, big data, and an artificial intelligence platform.

Figure 2:
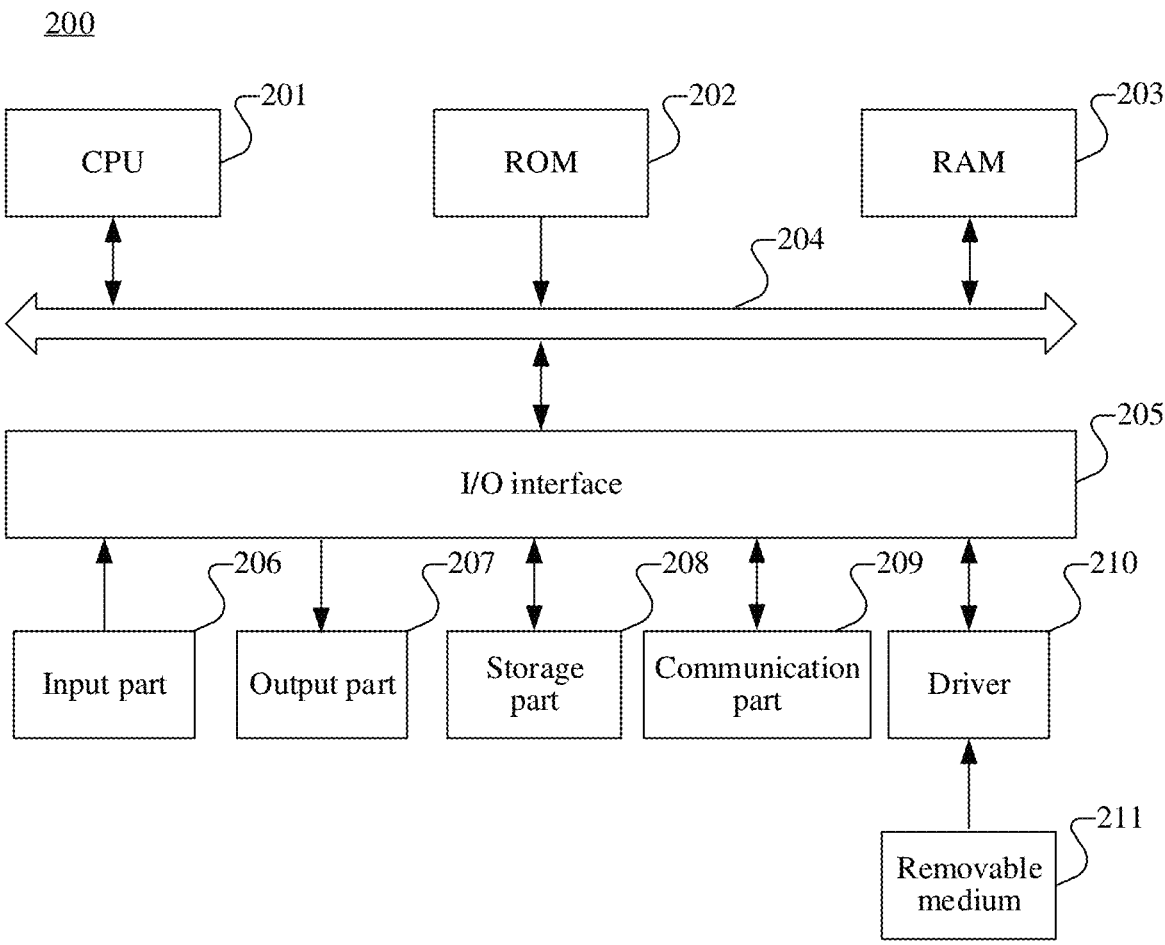
FIG. 2 is a schematic structural diagram of a computer system applied to a speech enhancement apparatus according to an embodiment of this disclosure.

Refer to FIG. 2 below which is a schematic structural diagram of a computer system 200 suitable for a terminal device configured to implement an embodiment of this disclosure. The terminal device shown in FIG. 2 is merely an example, and does not impose any limitation on the functionality or scope of use of the embodiment of this disclosure.

As shown in FIG. 2, the computer system 200 includes a central processing unit (CPU) 201, which may perform various appropriate actions and processing according to a program stored in a read-only memory (ROM) 202 or a program loaded from a storage part 208 into a random access memory (RAM) 203. Various programs and data needed by operations of the system 200 are also stored in the RAM 203. The CPU 201, the ROM 202, and the RAM 203 are connected to each other through a bus 204. An input/output (I/O) interface 205 is also connected to the bus 204.

The following members are connected to the I/O interface 205: an input part 206 including a keyboard, a mouse, or the like; an output part 207 including a cathode ray tube (CRT), a liquid crystal display (LCD), a loudspeaker, or the like; the storage part 208 including a hard disk or the like; and a communication part 209 including a network interface card such as a LAN card and a modem. The communication part 209 performs communication processing by using a network such as the Internet. A driver 210 is also connected to the I/O interface 205 as needed. A removable medium 211, such as a magnetic disk, an optical disc, a magneto-optical disk, or a semiconductor memory, is installed on the drive 210 as needed, so that a computer program read from the removable medium is installed into the storage part 208 as needed.

The processes described above by referring to the flowcharts may be implemented as computer software programs. For example, the embodiments of this disclosure include a computer program product, the computer program product includes a computer program carried on a non-transitory computer-readable storage medium, and the non-transitory computer program includes program code used for performing the methods shown in the flowcharts. In such an embodiment, the non-transitory computer program may be downloaded from a network via the communication part 209 and installed, and/or installed from the removable medium 211. When the computer program is executed by the CPU 201, the above functions defined in the system of this disclosure are performed.

The non-transitory computer-readable storage medium according to this disclosure may be a non-transitory computer-readable signal medium or a non-transitory computer-readable storage medium or any combination of the two media. The non-transitory computer-readable storage medium may be, for example, but is not limited to, an electric, magnetic, optical, electromagnetic, infrared, or semi-conductive system, apparatus, or component, or any combination thereof. The non-transitory computer-readable storage medium may include, for example, but is not limited to, an electrical connection having one or more wires, a portable computer disk, a hard disk, a RAM, a ROM, an erasable programmable read-only memory (EPROM or flash memory), an optical fiber, a portable compact disc read-only memory (CD-ROM), an optical storage device, a magnetic storage device, or any suitable combination of the foregoing. In this disclosure, the computer-readable storage medium may be any tangible medium containing or storing a program, and the program may be used by or used in combination with an instruction execution system, an apparatus, or a device. In this disclosure, a computer-readable signal medium may include a data signal being in a baseband or propagated as a part of a carrier wave, the data signal carrying computer-readable program code. A data signal propagated in such a way may assume a plurality of forms, including, but not limited to, an electromagnetic signal, an optical signal, or any appropriate combination thereof. The computer-readable signal medium may further be any computer-readable storage medium in addition to a computer-readable storage medium. The computer-readable storage medium may send, propagate, or transmit a program that is used by or used in conjunction with an instruction execution system, apparatus, or device. Program code embodied on the computer-readable storage medium may be transmitted using any appropriate medium, including, but not limited to, wireless, wire, optical cable, radio frequency (RF) media, or the like, or any suitable combination of the foregoing.

The flowcharts and block diagrams in the accompanying drawings illustrate possible system architectures, functions and operations that may be implemented by a system, a method, and a computer program product according to various embodiments of this disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Related modules and/or units described in the embodiments of this disclosure may be implemented in a software manner, or may be implemented in a hardware manner. The described modules and/or units may alternatively be disposed in a processor. For example, the processor may be described as: a processor including a sending unit, an obtaining unit, a determining unit, and a first processing unit. Names of these modules and/or units do not constitute a limitation on the modules and/or units in a case.

The term module (and other similar terms such as unit, submodule, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory) Likewise, a processor (or processors and memory) can be used to implement one or more modules. Moreover, each module can be part of an overall module that includes the functionalities of the module.

The embodiments of this disclosure further provide a non-transitory computer-readable storage medium. The non-transitory computer-readable storage medium may be included in the device described in the foregoing embodiments, or may exist alone and is not disposed in the device. The computer-readable storage medium carries one or more programs, the one or more programs, when executed by the device, causing the device to implement functions including: obtaining a clean speech sample; decomposing the clean speech sample to obtain a first sparse matrix and m base matrices, values in the first sparse matrix being all positive numbers, and m being a positive integer greater than 1; obtaining, according to the first sparse matrix and a weight matrix of a target neural network, state vectors of neurons in a visible layer of the target neural network; and updating the weight matrix according to the state vectors of the neurons in the visible layer and the clean speech sample, to obtain a deep dictionary used for speech enhancement.

Artificial intelligence (AI) is a theory, method, technology, and application system that uses a digital computer or a machine controlled by a digital computer to simulate, extend, and expand human intelligence, perceive an environment, obtain knowledge, and use the knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. The AI software technologies mainly include several major orientations such as a computer vision (CV) technology, a speech processing technology, a natural language processing technology, and machine learning (ML)/deep learning.

Exemplary technologies of the speech technology include an automatic speech recognition (ASR) technology, a text-to-speech (TTS) technology, and a voiceprint recognition technology. To make a computer capable of listening, seeing, speaking, and feeling is the future development direction of human-computer interaction, and speech has become one of the most promising human-computer interaction methods in the future.

ML is an interdisciplinarity involving a plurality of disciplines such as the probability theory, statistics, approximation theory, convex analysis, algorithm complexity theory, and the like. ML specializes in studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI. ML and deep learning generally include technologies such as an artificial neural network, a belief network, reinforcement learning, transfer learning, inductive learning, and learning from demonstrations.

The solutions provided in the embodiments of this disclosure relate to technologies such as speech enhancement and ML of AI, and are described by using the following embodiments.

Figure 3:
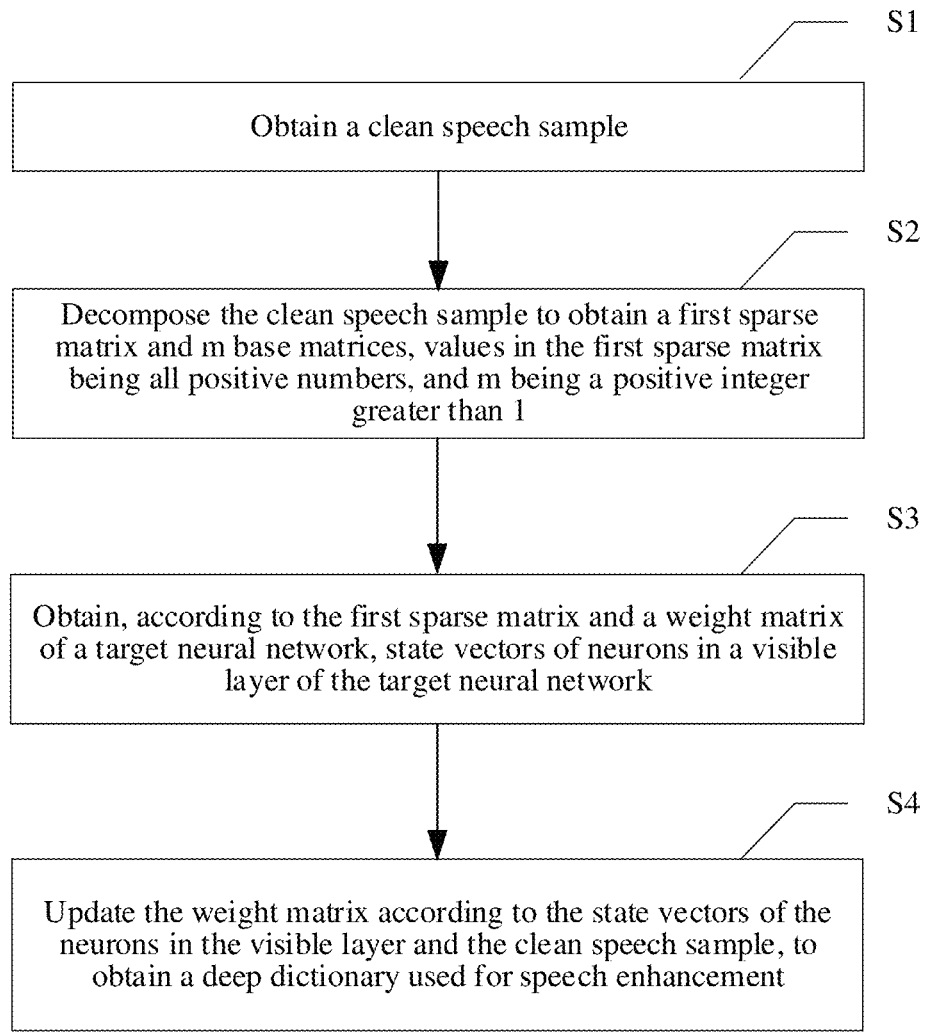
FIG. 3 is a flowchart of a speech enhancement method according to an embodiment of this disclosure.

FIG. 3 is a flowchart of a speech enhancement method according to this disclosure. The method provided in the embodiments of this disclosure may be processed by any electronic device with computational processing capability, for example, the server 105 and/or terminal devices 102 and 103 in the foregoing embodiment shown in FIG. 1. The embodiments below use an example in which the server 105 is the execution body for description.

Referring to FIG. 3, the speech enhancement method provided in the embodiments of this disclosure may include the following steps.

Speech enhancement is related to a technology, in which useful speech signals from the noisy background are extracted when speech signals are interfered with and even drown by various noise, so as to suppress and reduce noise interference. In short, speech enhancement is to extract original speech as pure as possible from noisy speech.

In the related art, in order to implement speech enhancement of noisy speech, a neural network model is usually trained in a supervised manner by using the noisy speech and corresponding clean speech to determine a mapping relationship between the noisy speech and the clean speech. However, in the foregoing speech enhancement method, a large amount of clean speech signals and noise signals need to be collected during the training process. The collection of noise signals consumes time and efforts, which is not beneficial to the improvement of speech enhancement efficiency. In addition, the generalization ability of speech enhancement of the neural network model trained by using the noisy speech and the clean speech is average. That is, when there is a relatively large difference between the noise in a test set and the noise in a training set, the noise cancellation ability of the neural network model will significantly decrease. Moreover, the neural network interpretability is relatively bad, and therefore the speech enhancement process cannot be appropriately interpreted.

Step S1: Obtain a clean speech sample.

Clean speech and its sample may refer to some pure speech signals that do not include noise or that includes negligible noise, or some speech signals that are substantially free of noise.

In some embodiments, some clean speech may be obtained as the training sample of a target neural network. For example, original speech (not including bath noise) in a game may be obtained as the training sample of the target neural network.

In the field of the speech technology, a speech signal may generally be represented by Formula (1).

$$Y = DX + n \quad (1).$$

$Y \in R^{M \times N}$ is observation speech, $X \in R^{M \times N}$ is a sparse matrix, $D \in R^{M \times N}$ is a dictionary, n is noise, M is the quantity of rows of the speech signal, N is the quantity of columns of the speech signal, both M and N are positive integers greater than or equal to 1, and R represents a real number field.

In some embodiments, sparse decomposition may be performed on the speech signal through Formula (1). The sparse decomposition of the speech signal may include using a linear combination of relatively few basic signals to represent the most or all of original signals Y according to a given overcomplete dictionary D, so as to obtain a more concise representation of the signals. The foregoing basic signals may be referred to as atoms.

Signal sparse decomposition based on an overcomplete dictionary is a new signal representation method, which replaces a conventional orthogonal basis function with an overcomplete redundant function system, and provides great flexibility for adaptive sparse expansion of signals. The sparse decomposition can achieve high-efficiency data compression and can take advantage of the redundant property of the dictionary to capture the intrinsic and essential features of signals.

Step S2: Decompose the clean speech sample to obtain a first sparse matrix and m base matrices, values in the first sparse matrix being all positive numbers, and m being a positive integer greater than 1.

In order to overcome the disadvantage of conventional dictionary learning that only low-level features of speech signals can be learned, this embodiment provides a method, by which a deep dictionary that can represent high-level features of the speech signals is extracted from clean speech to complete enhancement of noisy speech. For example, a deep semi non-negative matrix may be introduced into the hidden layer of a restricted Boltzmann machine (RBM) to train the deep dictionary that can represent the speech signal features.

The deep semi non-negative matrix may be represented by the following formula (2).

$$Y^{\pm} \approx Z_1^{\pm} Z_2^{\pm} Z_3^{\pm} \ldots Z_m^{\pm} H_m^{+} \quad (2).$$

$Y^{\pm}$ is a clean speech sample (which may be used as a state variable of observation neurons in the visible layer of the RBM), $Z_m^{\pm}$ is a base matrix, and $H_m$ is a sparse matrix (which may be used as a state variable of neurons in the hidden layer of the RBM), where the superscript ± represents that values in the matrix may be positive or negative, the superscript + represents that values in the matrix are limited to positive numbers, and m is a positive integer greater than or equal to 1.

In some embodiments, deep decomposition may be performed on the clean speech sample by using Formula (2), to obtain a first sparse matrix $H_m^{+}$ and m base matrices $Z_1^{\pm}$, $Z_2^{\pm}$, $Z_3^{\pm}$ ... $Z_m^{\pm}$.

It may be understood that the deep decomposition may alternatively be performed on the clean speech sample by adapting to a deep non-negative matrix, to obtain the first sparse matrix $H_m^{+}$ and the m base matrices $Z_1^{+}$, $Z_2^{+}$, $Z_3^{+}$ ... $Z_m^{+}$.

Step S3: Obtain, according to the first sparse matrix and a weight matrix of a target neural network, state vectors of neurons in a visible layer of the target neural network.

In some embodiments, the target neural network may be an RBM, and the RBM may include a visible layer and a hidden layer. A single element $w_{ij}$ in the weight matrix of the RBM may specify the weights of sides between hidden layer units $h_j$ and visible layer units $v_i$. In addition, each of the visible layer units $v_i$ may have a first bias term $a_i$, and each of the hidden layer units $h_j$ may have a second bias term $b_j$.

In some embodiments, the RBM may be used to process the clean speech sample, to obtain a deep dictionary h (which may be, for example, any one of $H_1$, $H_2$, $H_3$, ..., $H_m$ in Formula (2)) that can represent the intrinsic and essential feature of the clean speech sample, and the deep dictionary h may be used as a state variable of neurons in the hidden layer of the RBM.

In some embodiments, before training the RBM, a weight matrix W, first bias terms a, and second bias terms b of the RBM may be initialized first, and state variables $v^{*}$ of neurons in the visible layer of the target neural network may be reconstructed according to the weight matrix W, first bias terms a, and second bias terms b initialized, and the deep dictionary h, so that parameters in a target neural network model are updated according to reconstructed state variables $v^{*}$ of the neurons in the visible layer and initial state variables v of the observation neurons in the visible layer determined according to the clean speech sample.

Step S4: Update the weight matrix according to the state vectors of the neurons in the visible layer and the clean speech sample to obtain a deep dictionary used for speech enhancement.

In some embodiments, a short-time Fourier transform may be performed on the clean speech sample to obtain a spectrogram of the clean speech sample; the spectrogram of the clean speech sample may be determined as state variables v of observation neurons in the visible layer of the RBM.

In some embodiments, the state variables v of the observation neurons in the visible layer and the state variables $v^{*}$ of the neurons in the visible layer may be used to update the weight matrix W, the first bias terms a, and the second bias terms b of the target neural network in reverse.

In some embodiments, different clean speech samples may be used to train the target neural network until a training standard is achieved.

In some embodiments, the weight matrix W of the target neural network obtained after training may be a deep dictionary D eventually determined.

By using the speech enhancement method provided in the embodiments of this disclosure, a first sparse matrix, that can represent clean speech briefly as much as possible, is obtained through deep decomposition on the clean speech. The first sparse matrix is then introduced into the hidden layer of a target neural network to complete training of the target neural network, thereby obtaining a deep dictionary that can represent deep information of clean speech signals. On one hand, compared with a supervised speech enhancement method in the related art in which a large amount of noisy speech and corresponding clean speech are collected to train a neural network so as to determine a mapping relationship between noisy signals and clean signals, the present solution may complete obtaining of a deep dictionary in the speech enhancement technology with clean speech signals only, which has a better generalization ability. In addition, the present solution needs to collect clean speech only. Compared with the foregoing supervised speech enhancement method, the speech enhancement efficiency can be improved. On the other hand, in the embodiments of this disclosure, the deep dictionary that may represent the deep features of the clean speech signals is obtained through the decomposition on the clean speech, and deeper representation of the clean speech can be learned.

Figure 4:
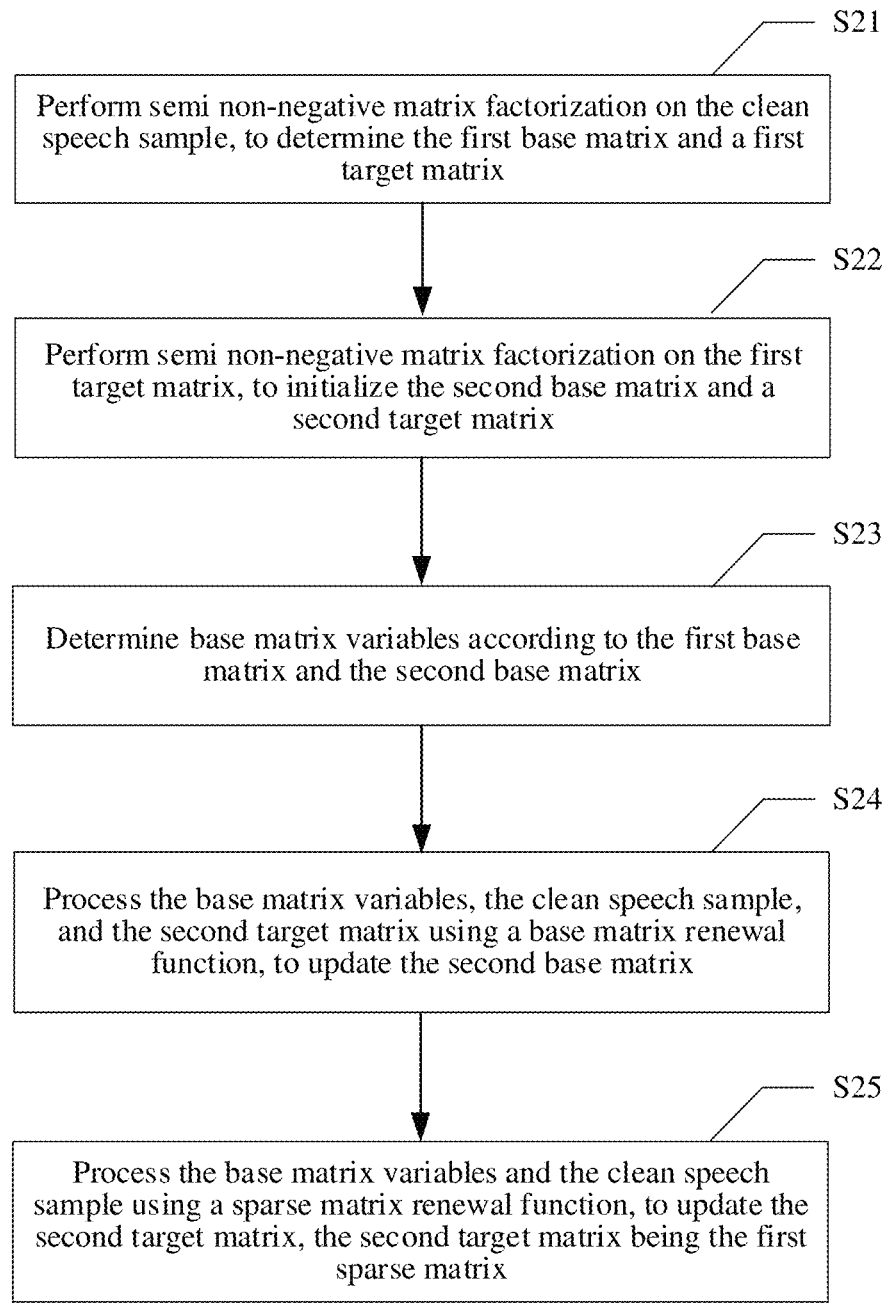
FIG. 4 is a flowchart of step S2 shown in FIG. 3 according to an exemplary embodiment.

FIG. 4 is a flowchart of step S2 shown in FIG. 3 according to an exemplary embodiment.

In some embodiments, a deep semi non-negative matrix may be used to process the clean speech sample to obtain the first sparse matrix that can represent the deep feature of the clean speech sample.

The factorization of the speech signals by using the semi non-negative matrix, on one hand, can implement dimensionality reduction of the speech signals with a huge data amount. If there are negative numbers in the sparse matrix obtained after decomposition, real meanings cannot be obtained in an actual situation. The factorization of the speech signals by using the semi non-negative matrix, on the other hand, can ensure that values in the sparse matrix eventually obtained are all positive numbers, which make sense in practical application. In addition, the factorization of the speech signals by using the deep semi non-negative matrix can further obtain the deep features of the speech signals, so that the speech signals can be better described.

In some embodiments, Formula (2) may be used to describe the deep semi non-negative matrix factorization. In some embodiments, the process of the deep semi non-negative matrix factorization may include initialization and iterative update.

Formula (3) describes the initialization of the deep semi non-negative matrix.

$$\begin{cases} Y^{\pm} \approx Z_1^{\pm} H_1 \\ Y^{\pm} \approx Z_1^{\pm} Z_2^{\pm} H_2 \\ Y^{\pm} \approx Z_1^{\pm} Z_2^{\pm} Z_3^{\pm} H_3 \\ \quad \ldots \\ \quad \ldots \\ Y^{\pm} \approx Z_1^{\pm} Z_2^{\pm} Z_3^{\pm} \ldots Z_m^{\pm} H_m \end{cases} \quad (3)$$

$Y^{\pm}$ is a clean speech sample (that is, a visible layer in an RBM), $Z_m^{\pm}$ is a base matrix, and $H_m$ is a sparse matrix (that is, a hidden layer in the RBM), where the superscript $\pm$ represents that values in the matrix may be positive or negative. The superscript + represents that values in the matrix are limited to positive numbers, and m is a positive integer greater than or equal to 1.

In some embodiments, the initialization of the deep semi non-negative matrix factorization may include the following steps.

$Y^{\pm} \approx Z_1^{+} H_1^{+}$ is factorized using a semi non-negative matrix factorization method, to obtain $Z_1^{+}$ and $H_1^{+}$. $H_1^{+} = Z_2^{+} H_2^{+}$ is factorized using a deep semi non-negative matrix factorization method, to obtain $Z_2^{+}$ and $H_2^{+}$. The rest may be deduced by analogy, until all $Z_i^{\pm}$ and $H_i^{+}$ are obtained (i is a positive integer greater than or equal to 1 and less than or equal to m).

In some embodiments, assuming that m is 2, the m base matrices may include a first base matrix and a second base matrix. The decomposing the clean speech sample to obtain the sparse matrix and the m base matrices may include the following steps:

Step S21: Perform semi non-negative matrix factorization on the clean speech sample to determine the first base matrix and a first target matrix.

Step S22: Perform semi non-negative matrix factorization on the first target matrix to initialize the second base matrix and a second target matrix.

In some embodiments, when the initialization of the m base matrices and corresponding target matrices in the deep semi non-negative matrix is completed, an optimal solution may be determined through iterative update as the first sparse matrix.

In some embodiments, an error function as shown in Formula (4) may be established according to the foregoing deep semi non-negative matrix.

$$C_{deep} = \frac{1}{2\|Y - Z_1 Z_2 \ldots Z_m H_m\|_F^2} = \quad (4)$$
$$tr[Y^T Y - 2Y^T Z_1 Z_2 \ldots Z_m H_m + H_m^T Z_m^T Z_{m-1}^T \ldots Z^T Z_1 Z_2 \ldots Z_m H_m],$$

where $C_{deep}$ represents the error function, Y represents the clean speech sample, $Z_1 Z_2 \ldots Z_m$ represents the m base matrices, $H_m$ represents the first sparse matrix, and m is a positive integer greater than or equal to 1.

Partial derivatives of the error function are solved with respect to $Z_i$ (where i is greater than or equal to 1 and less than or equal to m). A point where the partial derivative is 0 is the optimal solution of $Z_i$, which is represented by the following formula:

Make $C_{deep} = 0$, and $$Z_i = \psi_i^{+} Y \tilde{H}_i^{+} \quad (5) \text{ is obtained,}$$

where $$\begin{cases} \psi_i^{+} = Z_1 Z_2 \ldots Z_{i-1} & i \neq 1 \\ 1 & i = 1 \end{cases},$$

the matrix superscript + represents Moore-Penrose pseudoinverse, and $$\tilde{H}_i^{+} = \begin{cases} Z_{i+1} \tilde{H}_{i+1}^{+} & i \neq m \\ H_i^{+} & i = m \end{cases}.$$

Convex optimization theory is used to obtain the update calculation manner of the sparse matrix $H_i^{+}$:

$$H_i^{+} \leftarrow H_i^{+} \odot \sqrt{\frac{[(\psi_i^{+})^T X]^{POS} + [(\psi_i^{+})^T X]^{neg} H_i^{+}}{[(\psi_i^{+})^T X]^{neg} + [(\psi_i^{+})^T X]^{pos} H_i^{+}}}, \quad (6)$$

where the matrix superscript pos represents that all positive number elements in the matrix are retained, and all negative number elements are set to 0; and the matrix superscript neg represents that all negative number elements in the matrix are retained, and all positive number elements are set to 0.

It can be seen that the iterative update of the deep semi non-negative matrix factorization may include the following steps.

Step S23: Determine base matrix variables according to the first base matrix and the second base matrix.

In some embodiments, each of the base matrix variables $\psi_i$ may be determined according to a formula $\psi_i = Z_1 Z_2 \ldots Z_{i-1}$.

Step S24: Process the base matrix variables, the clean speech sample, and the second target matrix using a base matrix renewal function to update the second base matrix.

In some embodiments, each of the base matrices $Z_i$ may be iteratively updated according to Formula (5).

Step S25: Process the base matrix variables and the clean speech sample using a sparse matrix renewal function to update the second target matrix, the second target matrix being the first sparse matrix.

In some embodiments, each of the target matrices $H_i$ may be iteratively updated according to Formula (6) until an iteration number reaches a preset value, or the error function is less than a preset error value, and a target matrix $H_m$ is used as the first sparse matrix for output.

In the embodiments of this disclosure, the deep semi non-negative matrix may be used to process the clean speech sample, to determine the first sparse matrix that can guarantee the deep feature of the clean speech.

Figure 5:
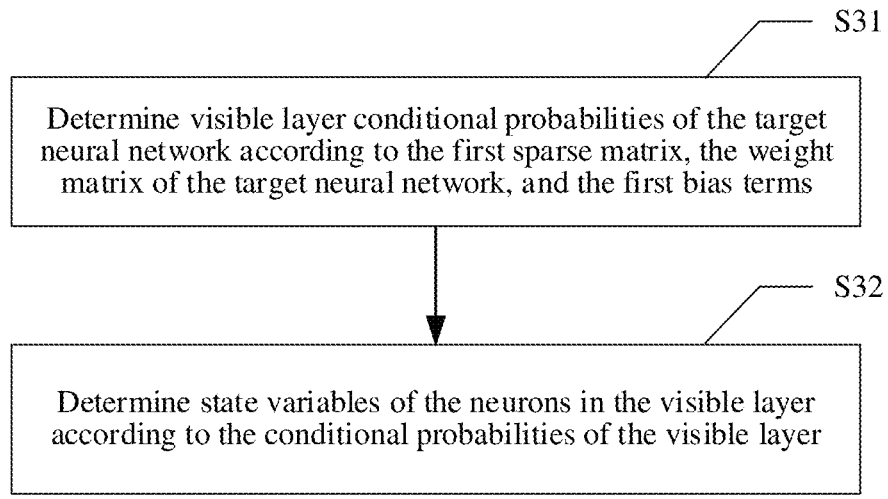
FIG. 5 is a flowchart of step S3 shown in FIG. 3 according to an exemplary embodiment.

FIG. 5 is a flowchart of step S3 shown in FIG. 3 according to an exemplary embodiment.

In some embodiments, the target neural network may be an RBM, and the RBM may include first bias terms a.

Referring to FIG. 5, the foregoing step S3 may include the following steps.

Step S31: Determine visible layer conditional probabilities of the target neural network according to the first sparse matrix, the weight matrix of the target neural network, and the first bias terms.

In some embodiments, the visible layer conditional probabilities of the target neural network may be determined according to Formula (7).

$$p(v_i^*|h)=\text{logistic}(a_i+\Sigma_j w_{ij} h_j) \qquad (7).$$

logistic ( ) above may be an activation function, for example, $$\text{logistic}(x) = \frac{1}{1+e^{-x}}.$$

$p(v_i^*|h)$ represents that the visible layer has a conditional probability about the hidden layer, $v_i^*$ may represent an $i^{th}$ state variable of neurons in the visible layer, h represents a state variable of neurons in the hidden layer, $a_i$ represents an $i^{th}$ first bias term of the visible layer, $W_{ij}$ represents the value of an $i^{th}$ row and a $j^{th}$ column of the weight matrix, and $h_j$ represents a $j^{th}$ value of the state variable (that is, the deep dictionary) of the neurons in the hidden layer of the target neural network.

Step S32: Determine state variables of the neurons in the visible layer according to the conditional probabilities of the visible layer.

In some embodiments, a manner of random sampling may be used to determine the state variables of the neurons in the visible layer according to the conditional probabilities of the visible layer. For example, a random number $r_i$ is generated on [0, 1], and the state variables $v^*$ of the neurons in the visible layer are determined according to Formula (8).

$$v_i^* = \begin{cases} 1 & \text{if } r_i < p(v_i^*|h) \\ 0 & \text{otherwise} \end{cases} \qquad (8)$$

In the embodiments of this disclosure, the state variables of the neurons in the visible layer may be determined according to the state variables of the neurons in the hidden layer based on the conditional probabilities of the visible layer in reverse.

Figure 6:
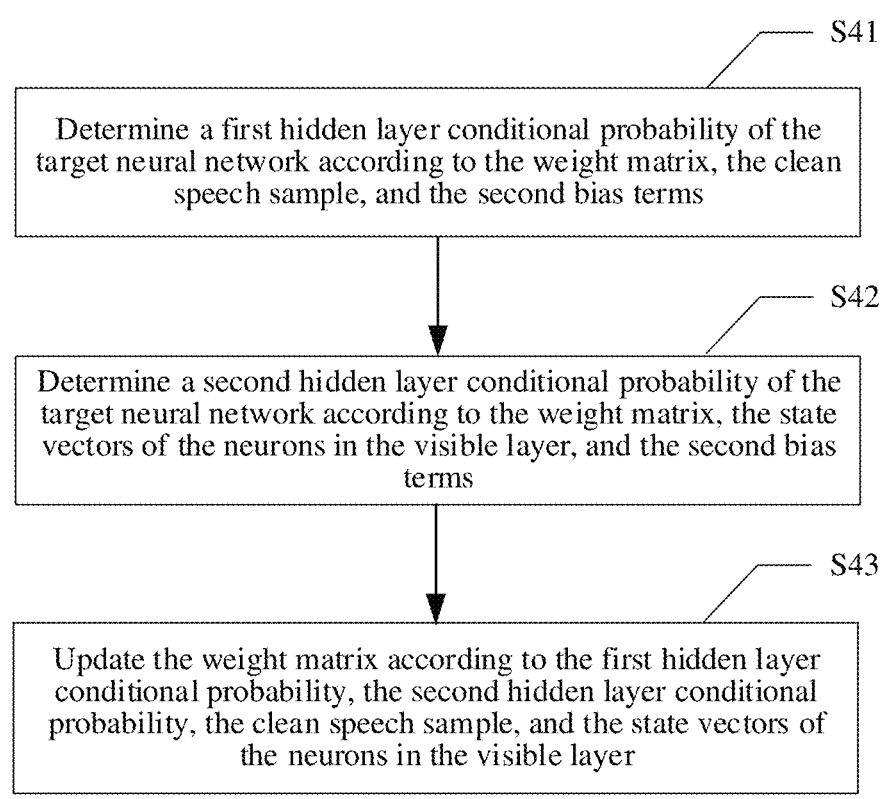
FIG. 6 is a flowchart of step S4 shown in FIG. 3 according to an exemplary embodiment.

FIG. 6 is a flowchart of step S4 shown in FIG. 3 according to an exemplary embodiment.

In some embodiments, the target neural network may be an RBM, and the RBM may include second bias terms b.

Referring to FIG. 6, the foregoing step S4 may include the following steps.

Step S41: Determine a first hidden layer conditional probability of the target neural network according to the weight matrix, the clean speech sample, and the second bias terms.

In some embodiments, the first hidden layer conditional probability may be determined according to Formula (9).

$$p(h_j|v)=\text{logistic}(bj+\Sigma_i w_{ij} v_i) \qquad (9).$$

$p(h_j|v)$ represents the first hidden layer conditional probability, logistic ( ) may be an activation function, for example, $$\text{logistic}(x) = \frac{1}{1+e^{-x}},$$

$p(h_j|v)$ may represent that the hidden layer has a conditional probability about the visible layer, v may represent the state variables of the neurons in the visible layer, $h_j$ represents a $j^{th}$ state variable of the neurons in the hidden layer, $b_j$ represents a $j^{th}$ second bias term of the visible layer, $W_{ij}$ represents the value of the $i^{th}$ row and the $j^{th}$ column of the weight matrix, and $v_i$ represents an $i^{th}$ value of the state variables of the neurons in the visible layer of the target neural network.

Step S42: Determine a second hidden layer conditional probability of the target neural network according to the weight matrix, the state vectors of the neurons in the visible layer, and the second bias terms.

In some embodiments, the second hidden layer conditional probability may be determined according to Formula (10).

$$p(h_j|v^*)=\text{logistic}(bj+\Sigma_i w_{ij} v_i^*) \qquad (10).$$

$p(h_j|v^*)$ represents the second hidden layer conditional probability, logistic ( ) may be an activation function, for example, $$\text{logistic}(x) = \frac{1}{1+e^{-x}},$$

$p(h_j|v^*)$ may represent that the hidden layer has a conditional probability about the visible layer, $v^*$ may represent reconstructed state variables of the neurons in the visible layer, $h_j$ represents the $j^{th}$ state variable of the neurons in the hidden layer, $b_j$ represents the $j^{th}$ second bias term of the visible layer, $W_{ij}$ represents the value of the $i^{th}$ row and the $j^{th}$ column of the weight matrix, and $v_i^*$ represents an $i^{th}$ value of the reconstructed state variables of the neurons in the visible layer.

Step S43: Update the weight matrix according to the first hidden layer conditional probability, the second hidden layer conditional probability, the clean speech sample, and the state vectors of the neurons in the visible layer.

In some embodiments, the weight matrix W may be updated according to Formula (11).

$$W \leftarrow W + \epsilon \times (p(h=1|v)v^T - p(h=1|v^*)v^{*T}) \qquad (11).$$

$p(h=1|v)$ represents the first hidden layer conditional probability, $p(h=1|v^*)$ represents the second hidden layer conditional probability, $v^T$ represents the transposition of the state variables of the neurons in the visible layer determined according to the clean speech sample, $v^{*T}$ may represent the reconstructed state variables of the neurons in the visible layer, h represents the transposition of the state variables of the neurons in the hidden layer, and $\epsilon$ represents a learning rate.

Figure 7:
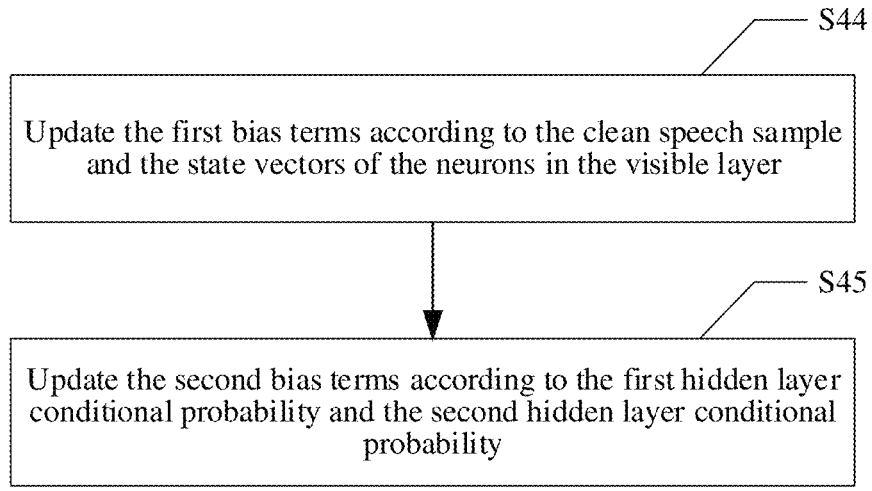
FIG. 7 is a flowchart of step S4 shown in FIG. 3 according to an exemplary embodiment.

FIG. 7 is a flowchart of step S4 shown in FIG. 3 according to an exemplary embodiment. Referring to FIG. 7, the foregoing step S4 may include the following steps.

Step S44: Update the first bias terms according to the clean speech sample and the state vectors of the neurons in the visible layer.

In some embodiments, the first bias terms a may be updated according to Formula (12).

$$a \leftarrow a + \epsilon \times (v-v^*) \qquad (12),$$

where $\epsilon$ represents the learning rate, v represents the state variables of the neurons in the visible layer determined according to the clean speech sample, and v* may represent the reconstructed state variables of the neurons in the visible layer.

Step S45: Update the second bias terms according to the first hidden layer conditional probability and the second hidden layer conditional probability.

In some embodiments, the second bias terms b may be updated according to Formula (13).

$$b \leftarrow b + \varepsilon[p(h=1|v) - p(h=1|v^*)] \quad (13),$$

where ε represents the learning rate, p(h=1|v) represents the first hidden layer conditional probability, and p(h=1|v*) represents the second hidden layer conditional probability.

Figure 8:
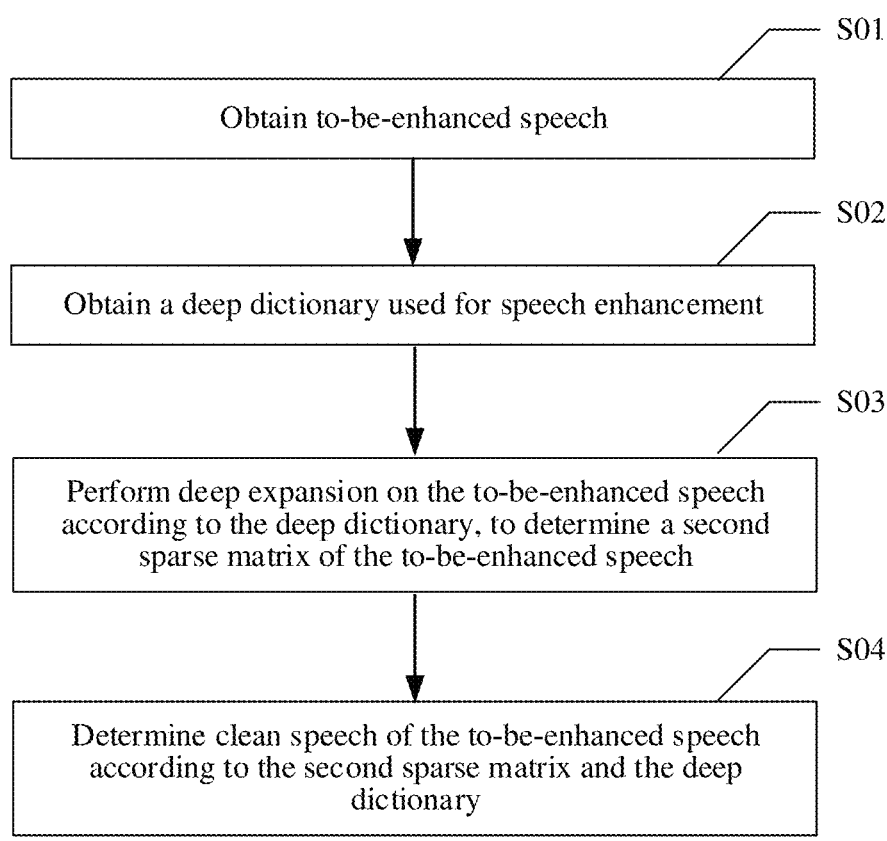
FIG. 8 is a flowchart of a speech enhancement method according to an embodiment of this disclosure.

FIG. 8 is a flowchart of a speech enhancement method according to an embodiment of this disclosure. The method provided in the embodiments of this disclosure may be processed by any electronic device with computational processing capability, for example, the server 105 and/or terminal devices 102 and 103 in the foregoing embodiment shown in FIG. 1. The embodiments below use an example in which the server 105 is the execution body for description.

Referring to FIG. 8, the speech enhancement method provided in the embodiments of this disclosure may include the following steps.

Step S01: Obtain to-be-enhanced speech.

In some embodiments, the to-be-enhanced speech may refer to speech signals including noise.

Step S02: Obtain a deep dictionary that may be used for speech enhancement.

In some embodiments, the foregoing speech enhancement method may be used to obtain the deep dictionary used for speech enhancement.

Step S03: Perform deep expansion on the to-be-enhanced speech according to the deep dictionary, to determine a second sparse matrix of the to-be-enhanced speech.

In some embodiments, the process of obtaining a second sparse matrix X from a piece of noisy speech $Y_n$ may be represented by a formula y=DX+n, and sparse representation may be represented by Formula (14).

$$\min_x (0.5\|Y_n - DX\|^2 + \lambda\|X\|_1), \quad (14)$$

where $Y_n$=DX+n, $Y_n$ represents the to-be-enhanced speech, D represents the deep dictionary, X represents the second sparse matrix X, and λ is a preset parameter.

In some embodiments, in order to resolve the problem of least absolute shrinkage and selection operator (Lasso), an iterative soft-thresholding algorithm (ISTA), a LISTA (learned iterative soft-thresholding algorithm), or a TISTA (trainable iterative soft-thresholding algorithm) may be used to determine the sparse matrix of the noisy speech.

Step S04: Determine clean speech of the to-be-enhanced speech according to the second sparse matrix and the deep dictionary.

In some embodiments, sparse learning may be performed on the noisy speech using the dictionary D learned from the clean speech, to obtain the second sparse matrix X, and the obtained DX is used as a final noise-canceled speech.

In some embodiments, clean speech Y* of the to-be-enhanced speech may be determined according to Formula (15).

$$Y^* = DX \quad (15),$$

where D represents the deep dictionary, and X represents the second sparse matrix of the to-be-enhanced speech.

In the embodiments of this disclosure, the sparse matrix of the noisy speech is accurately determined, and the clean speech is accurately recovered from the noisy speech based on the sparse matrix and the deep dictionary of the clean speech. The method may be applied to different speech signals with a strong generalization ability.

Figure 9:
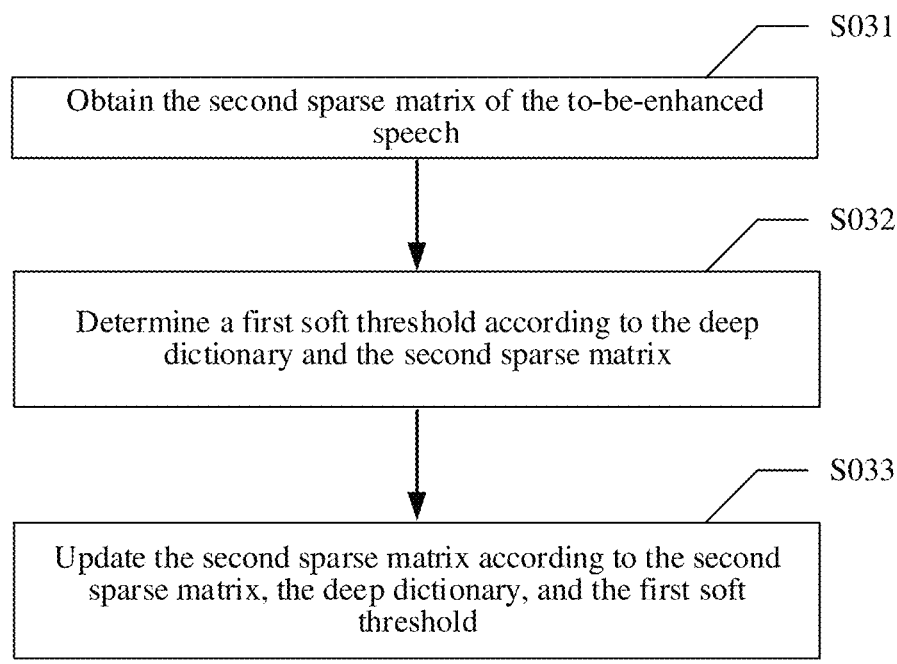
FIG. 9 is a flowchart of step S03 shown in FIG. 8 according to an exemplary embodiment.

FIG. 9 is a flowchart of step S03 shown in FIG. 8 according to an exemplary embodiment.

In some embodiments, in order to resolve the problem of Lasso during linear regression, the ISTA, LISTA, or TISTA may be used to determine the sparse matrix of the noisy speech. The problem of Lasso is mainly used to describe a constrained optimization problem during the linear regression. The problem of Lasso limits the linear regression of an L1 norm.

Referring to FIG. 9, the foregoing step S03 may include the following steps.

In some embodiments, the foregoing Formula (14) may be solved using the ISTA, for example, iteratively solved using Formula (16).

$$x^{(k+1)} = \eta_{\frac{\lambda}{L}} D^T(y_n - Dx^k), k = 1, 2, 3, \quad (16)$$

where $\eta_{\frac{\lambda}{L}}(x) = \text{sign}(x)\max\left(0, |x| - \frac{\lambda}{L}\right)$ is a first soft threshold, and sign(x) may be defined as:

$$\text{sign}(x) = \begin{cases} +1 & x > 0 \\ 0 & x = 0. \\ -1 & x < 0 \end{cases} \quad (17)$$

L is the maximum feature value in $D^T D$, λ is a preset parameter, and D is the deep dictionary.

Step S031: Obtain the second sparse matrix of the to-be-enhanced speech.

In some embodiments, the second sparse matrix of the to-be-enhanced speech may be initialized as $x^k$ during first iteration. For example, variables in $x^k$ may be arbitrarily assigned.

Step S032: Determine a first soft threshold according to the deep dictionary and the second sparse matrix.

In some embodiments, the first soft threshold $$\eta_{\frac{\lambda}{L}}$$

may be determined according to $$\eta_{\frac{\lambda}{L}}(x) = \text{sign}(x)\max\left(0, |x| - \frac{\lambda}{L}\right),$$

where L is the maximum feature value in $D^T D$ (D being the deep dictionary).

Step S033: Update the second sparse matrix according to the second sparse matrix, the deep dictionary, and the first soft threshold.

The updating the second sparse matrix according to the second sparse matrix, the deep dictionary D, and the first soft threshold may include the following steps:

Step one: Initialize the second sparse matrix to obtain $x^k$, where k=1.

Step two: Determine $x^{k+1}$ according to Formula (16).

Step three: k=k+1, and return to step two, until an iteration number reaches a preset threshold, or $|x^k - x^{k+1}| < \varepsilon$.

In this embodiment, the sparse matrix is determined from the noisy speech using the ISTA. The method resolves the problem of Lasso during the regression.

Figure 10:
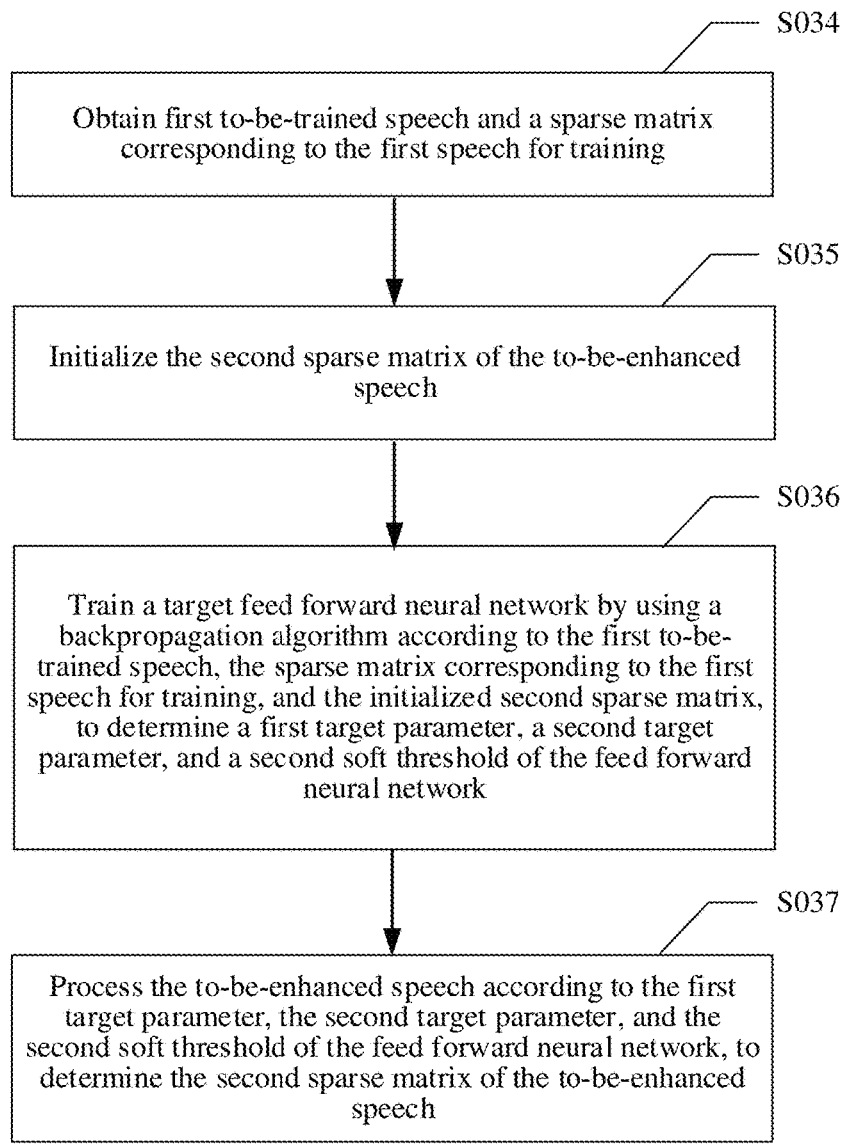
FIG. 10 is a flowchart of step S03 shown in FIG. 8 according to an exemplary embodiment.

FIG. 10 is a flowchart of step S03 shown in FIG. 8 according to an exemplary embodiment. Referring to FIG. 10, the foregoing step S03 may include the following steps.

In some embodiments, the foregoing Formula (14) may be solved using the LISTA, for example, iteratively solved using Formula (18).

$$x^{(k+1)} = \eta_{\theta^{(k)}}(W_1^k y + W_2^k x^k), k=1,2,3,4 \ldots K-1 \quad (18),$$

where K is a positive integer greater than or equal to 1.

The solving using the LISTA may include the following steps:

Step S034: Obtain first speech for training and a sparse matrix corresponding to the first speech for training.

In some embodiments, sparse decomposition may be performed on any speech (which may be, for example, noisy speech or clean speech) to obtain the first speech for training and the sparse matrix corresponding to the first speech for training.

Step S035: Initialize the second sparse matrix of the to-be-enhanced speech.

In some embodiments, before the optimal sparse matrix of the to-be-enhanced speech is determined, the second sparse matrix may be initialized, that is, the second sparse matrix may be arbitrarily assigned.

Step S036: Train a target feed forward neural network by using a backpropagation algorithm according to the first speech for training, the sparse matrix corresponding to the first speech for training, and the initialized second sparse matrix to determine a first target parameter, a second target parameter, and a second soft threshold of the feed forward neural network.

The backpropagation algorithm is a supervised learning algorithm. The backpropagation algorithm mainly includes two iterative cycles of excitation propagation and weight update until the response of a target network to input reaches a predefined target range.

The excitation propagation may include two steps:
1. Forward propagation stage: Input a training sample to the target network to obtain excitation response.
2. Backpropagation stage: Obtain the difference between an excepted excitation response and the excitation response corresponding to the training sample, to obtain a response error.

The weight update may include the following two steps:
1. Multiply the excitation response corresponding to the training sample by the foregoing response error, to obtain the gradient of the weights of the target network.
2. Weight the foregoing gradient, take an inverse, and add to the weights before update, to obtain updated weights.

Figure 11:
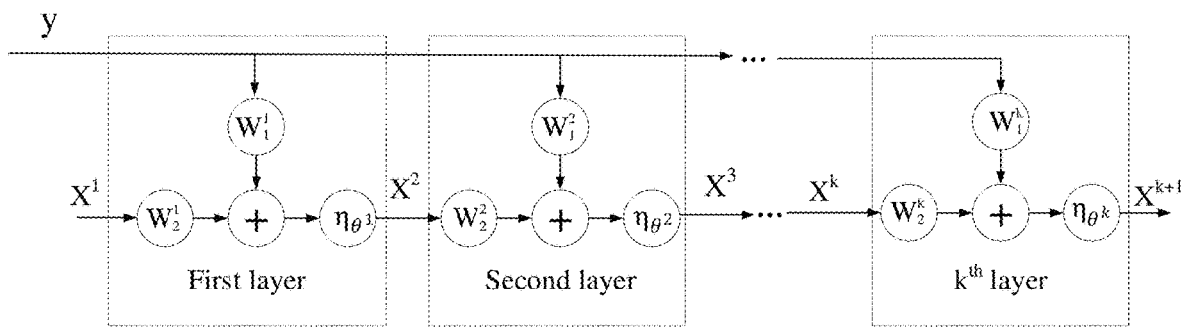
FIG. 11 is a schematic structural diagram of a learned iterative soft-thresholding algorithm (LISTA) according to an embodiment of this disclosure.

In some embodiments, parameters in the LISTA may be determined using a feed forward neural network shown in FIG. 11. It may be understood that, in the LISTA, the weight matrix W is used to replace parameters set in the ISTA, and the quantity of iteration layers truncated is the quantity of feed forward neural network layers expanded from the algorithm.

As shown in FIG. 11, a first target parameter $W_1^k$, a second target parameter $W_2^k$, and a second soft threshold $n_{\theta^k}$ included in the feed forward neural network may all be parameters learned from the training of the feed forward neural network.

As shown in FIG. 11, updating the parameters in the feed forward neural network, to determine the second sparse matrix of the to-be-enhanced speech includes the following steps.

Step one: Initialize the second sparse matrix of the to-be-enhanced speech to obtain $x^k$, where k=1.

Step two: Use the sparse matrix corresponding to the first speech for training as $x^{k+1}$.

Step three: Determine the parameters $W_1^k$ and $W_2^k$ and $\eta_{\theta^k}$ of the feed forward neural network using the backpropagation algorithm.

Step four: Repeat steps one to four, until an iteration number reaches a preset threshold, or $E_{x^*,y} \|x^k(\Theta,y,x^1) - x^*\| < \varepsilon$, where $\Theta = \{(W_1^k, W_2^k, \eta_{\theta^k})\}_1^k$. $x^*$ may refer to clean speech corresponding to first speech for training y, and $x^1$ may refer to the initialized second sparse matrix.

Step S037: Process the to-be-enhanced speech according to the first target parameter, the second target parameter, and the second soft threshold of the feed forward neural network to determine the second sparse matrix of the to-be-enhanced speech.

In some embodiments, after parameters in a structure chart corresponding to the LISTA are determined, the initialized second sparse matrix may be used as $x^1$ and the to-be-enhanced speech may be used as y to input into a structure corresponding to the LISTA, to determine an optimal sparse matrix X of the to-be-enhanced speech. Then, the clean speech of the to-be-enhanced speech is determined using Formula (15).

In this embodiment, the sparse matrix is determined from the noisy speech using the LISTA. On one hand, the method resolves the problem of Lasso during the regression. On the other hand, the method has a relatively high convergence rate since the parameters are trained using the neural network in the method.

Figure 12:
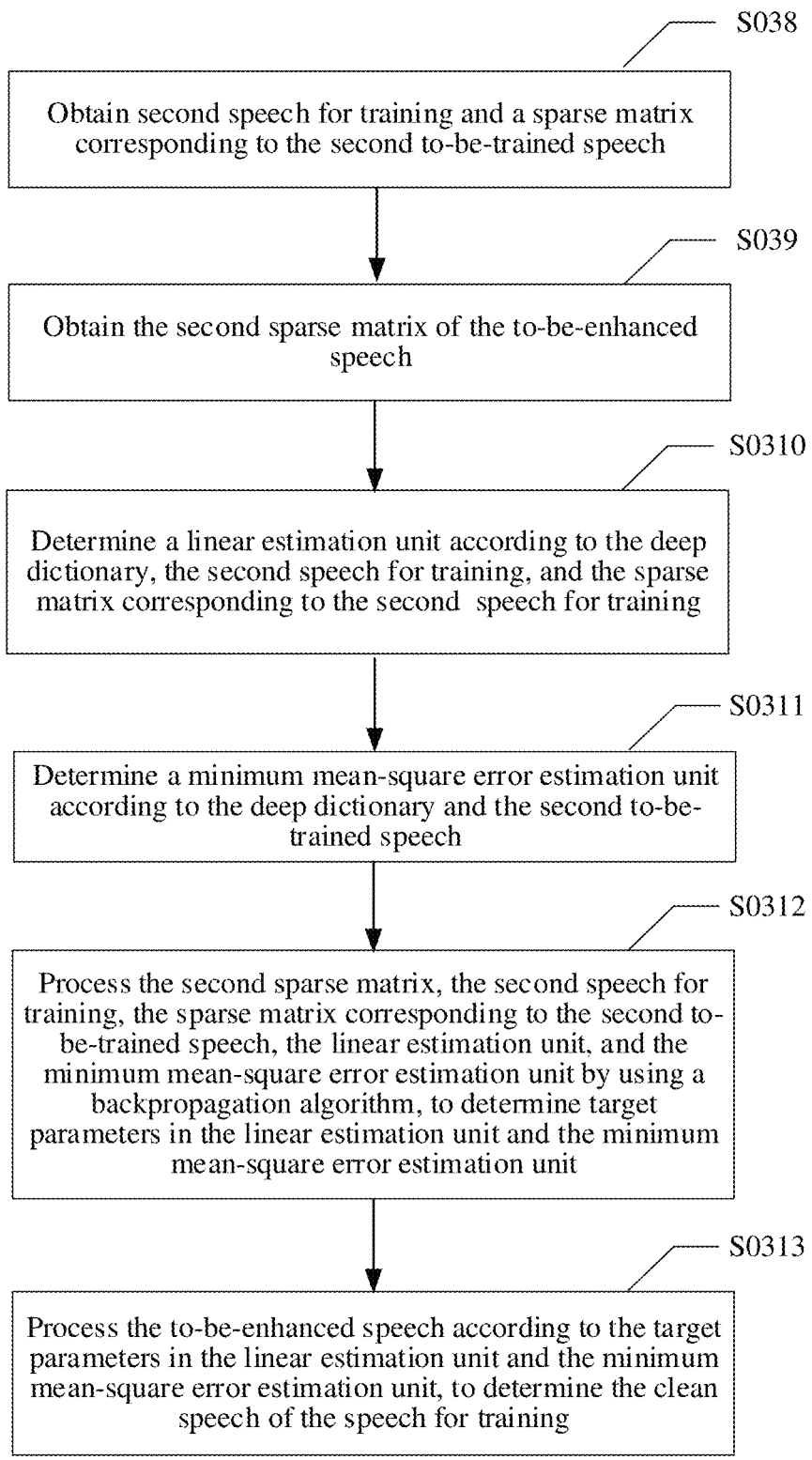
FIG. 12 is a flowchart of step S03 shown in FIG. 8 according to an exemplary embodiment.

FIG. 12 is a flowchart of step S03 shown in FIG. 8 according to an exemplary embodiment.

Figure 13:
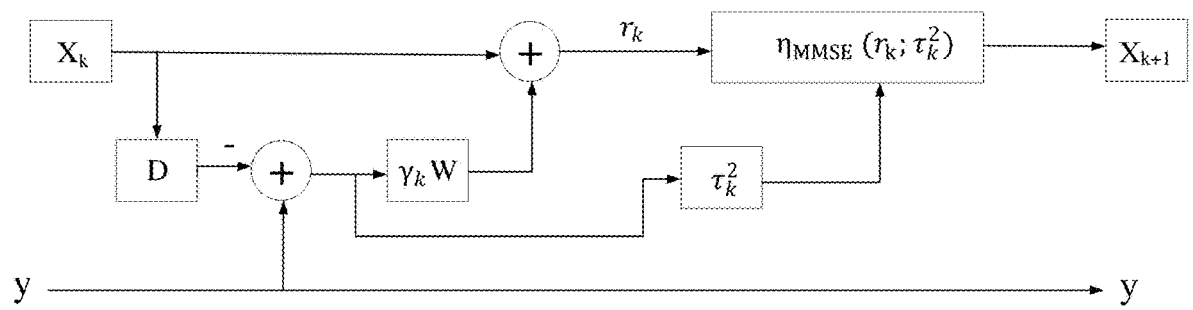
FIG. 13 is a schematic structural diagram of a trained iterative soft-thresholding algorithm (TISTA) according to an embodiment of this disclosure.

In some embodiments, parameters in the TISTA may be determined using a neural network structure shown in FIG. 13. As shown in FIG. 13, the neural network structure may include a linear estimation unit $r_k$ and a minimum mean-square error estimation unit $\tau_k^2$.

In some embodiments, as can be seen from FIG. 13, Formula (14) may be solved, for example, using Formula (19).

$$x_{k+1} = \eta_{MMSE}(r_k; \tau_k^2) \quad (19).$$

Parameters $r_k$, $\tau_k^2$ in Formula (19) may be determined according to Formulas (20) and (21), and the function $\eta_{MMSE}$ may be determined according to Formula (22).

$$r_k = x_k + \gamma_k W(y - Dx_k) \quad (20),$$

where $\gamma_k$ is a to-be-learned parameter, y is an inputted second speech for training, $x_k$ may be a to-be-learned sparse matrix, D is the deep dictionary, and $W = D^T(DD^T)^{-1}$.

$$\tau_k^2 = \frac{v_k^2}{N}\left(N + (\gamma_k^2 - 2\gamma_k)M\right) + \frac{\gamma_k^2 \sigma^2}{N}\mathrm{trace}(WW^T), \quad (21)$$

where N and M may refer to the quantities of rows and columns in the deep dictionary D.

$$\eta_{MMSE}(y, \sigma^2) = \left(\frac{y\sigma^2}{\xi}\right)\frac{pF(y;\xi)}{(1-p)F(y;\sigma^2) + pF(y;\xi)}, \quad (22)$$

where $\sigma^2$ may represent the average value of the equation of a speech perturbation signal n, and p represents the probability of non-zero elements.

The function $v_k^2$ in Formula (21) may be represented by Formula (23), $\xi$ in Formula (22) may be represented by Formula (24), and the function F may be represented by Formula (25).

$$v_k^2 = \max\left(\frac{\|y - Ax_k\|_2^2 - M\sigma^2}{\text{trace}(D^T D)}, \varepsilon\right), \quad (23)$$

where $\varepsilon$ is a set error value, for example, $\varepsilon$ may be $e^{-9}$.

$$\xi = \alpha^2 + \sigma^2, \quad (24)$$

$$F(z; v) = \frac{1}{\sqrt{2\pi v}} e\left(\frac{-z^2}{2v}\right), \quad (25)$$

where $\sigma^2$ in Formula (24) may represent the average value of the equation of the speech perturbation signal n, and $\sigma^2$ may represent the variance of the non-zero elements in the speech perturbation signal n.

In some embodiments, the parameter $\gamma_k$ in the neural network structure may be determined using a plurality of pieces of speech for training.

In some embodiments, the process of determining the second sparse matrix of the to-be-enhanced speech using the LISTA may include the following steps.

Step S038: Obtain second speech for training and a sparse matrix corresponding to the second speech for training.

In some embodiments, sparse decomposition may be performed on any speech (which may be, for example, noisy speech or clean speech) to obtain the second speech for training and the sparse matrix corresponding to the second speech for training.

Step S039: Obtain the second sparse matrix of the to-be-enhanced speech.

Step S3010: Determine a linear estimation unit according to the deep dictionary, the second speech for training, and the sparse matrix corresponding to the second speech for training.

In some embodiments, the linear estimation unit $r_k$ may be determined according to Formula (20). It may be understood that there is the to-be-learned parameter $\gamma_k$ in the linear estimation unit.

Step S3011: Determine a minimum mean-square error estimation unit according to the deep dictionary and the second speech for training.

In some embodiments, the minimum mean-square error estimation unit $\tau_k^2$ may be determined according to Formula (21), where there is the to-be-learned parameter $\gamma_k$ in $\tau_k^2$.

Step S0312: Process the second sparse matrix, the second speech for training, the sparse matrix corresponding to the second speech for training, the linear estimation unit, and the minimum mean-square error estimation unit by using a backpropagation algorithm, to determine target parameters in the linear estimation unit and the minimum mean-square error estimation unit.

In some embodiments, the second speech for training may be used as y, the initialized second sparse matrix may be used as $x_k$, and the sparse matrix corresponding to the second speech for training may be used as $x_{k+1}$ to train the neural network shown in FIG. 13 to determine the target parameters in the linear estimation unit and the minimum mean-square error estimation unit.

Step S0313: Process the to-be-enhanced speech according to the target parameters in the linear estimation unit and the minimum mean-square error estimation unit, to determine the clean speech of the to-be-enhanced speech.

In some embodiments, after the target parameters in the linear estimation unit and the minimum mean-square error estimation unit are determined, the initialized second sparse matrix may be used as $x_k$ and the noisy speech may be used as the speech signal y to input to the neural network shown in FIG. 13, to determine the optimal sparse matrix of the to-be-enhanced speech.

In some embodiments, the technical solution provided in this embodiment may be represent by steps in the following cycle.

Step one: Initialize the second sparse matrix of the to-be-enhanced speech to obtain $x^k$, where k=1.

Step two: Obtain second speech for training y and a sparse matrix corresponding to the second speech for training $x^{k+1}$.

Step three: Determine parameters $\gamma_k$, p, and $\alpha$ of the feed forward neural network using the backpropagation algorithm.

Step four: Determine $x^k$ in a next cycle according to $x^k$ in a present cycle and updated $\gamma_k$, p, and $\alpha$. Repeat steps two to four, until an iteration number reaches a preset threshold, or $E\|x^T(\gamma_k, p, \text{ and } \alpha) - x^*\| < \varepsilon$, where $x^*$ may refer to the optimal sparse matrix of the to-be-enhanced speech.

After the training ends, the noisy speech may be used as the input speech y to input into the neural network structure to determine the optimal sparse matrix (that is, the second sparse matrix) of the to-be-enhanced speech.

In this embodiment, the sparse matrix is determined from the noisy speech using the TISTA. On one hand, the method resolves the problem of Lasso during the regression. On the other hand, the method has a relatively high convergence rate since the parameters are trained using the neural network in the method. In addition, since the method has few training parameters, training using the method is more likely to be stable.

In some embodiments, the to-be-enhanced speech is a sequence signal. A Fourier transform may be performed on the to-be-enhanced speech to obtain a first spectrogram of the to-be-enhanced speech, so as to perform deep expansion on the first spectrogram of the to-be-enhanced speech.

In some embodiments, since the clean speech determined according to Formula (15) does not include phase information, the phase information of the to-be-enhanced speech may be obtained. A second spectrogram of the to-be-enhanced speech is determined according to the second sparse matrix and the deep dictionary. The phase information and the second spectrogram are superimposed, to obtain a second spectrogram including the phase information.

In some embodiments, an inverse Fourier transform may further be performed on the second spectrogram including the phase information, to determine the clean speech of the to-be-enhanced speech in the time domain.

Figure 14:
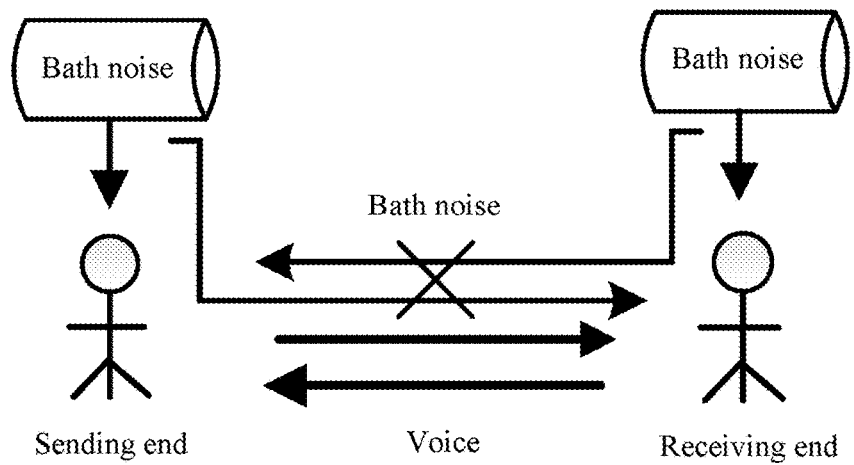
FIG. 14 is a schematic diagram of an effect of speech enhancement according to an embodiment of this disclosure.

FIG. 14 is a schematic diagram of an effect of speech enhancement according to an exemplary embodiment.

As shown in FIG. 14, by using the speech enhancement methods provided in the foregoing embodiments, speech enhancement may be performed on speech signals sent by a sending end (or sent by a receiving end) to eliminate bath noise, so that the receiving end and the sending end can perform high-quality speech communication.

Figure 15:
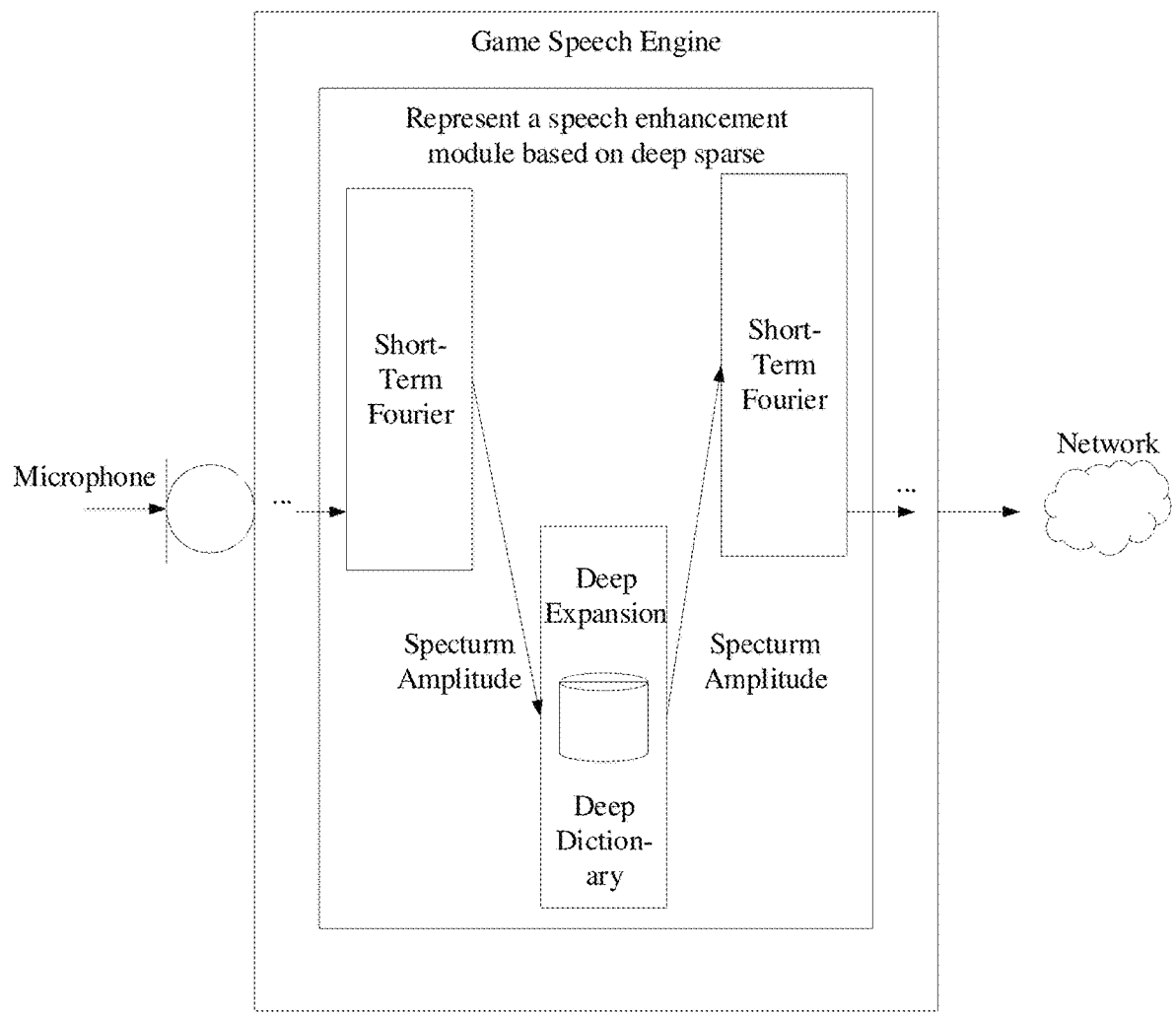
FIG. 15 is a game speech engine according to an embodiment of this disclosure.

FIG. 15 is a game speech engine according to an exemplary embodiment.

In some embodiments, the speech enhancement methods provided in the embodiments of this disclosure may be applied to the field of games, and the application process may include the following steps.

Top hundred models are obtained by investigating and screening devices in games. The models are respectively set under a media and speech mode, and a group of recorders is selected, the recorders covering males and females of all ages. Common texts in games are selected for recording in a quiet environment (where bath noise is less than 30 decibels), to generate a clean speech database. A short-time Fourier transform is performed on data in the clean speech database piece by piece, and only the information of spectrum amplitude is retained to obtain a two-dimensional spectrogram $Y \in R^{M \times N}$. A deep dictionary D suitable for a game speech scene is eventually generated by combining an RBM and deep semi non-negative matrix factorization using the speech enhancement methods provided in the embodiments of this disclosure.

As shown in FIG. 15, during enhancement of noisy speech, after a microphone in a game interface is switched on, the microphone starts to collect sounds. When the sounds pass through a game speech engine module, the module loads the generated deep dictionary D, performs a short-time Fourier transform on the noisy speech, and uses the two-dimensional spectrogram $Y \in R^{M \times N}$ after the Fourier transform as the noisy speech. Any one of the three solutions (solution one ISTA, solution two LISTA, and solution three TISTA) provided in the embodiments of this disclosure is used to determine an optimal sparse matrix X of noisy speech Y using the dictionary D. A final DX is enhanced spectrum amplitude. Enhanced speech may be obtained after a short-time inverse Fourier transform is performed in combination with the phase spectrum of the noisy speech Y, transmitted to a next processing module of the game speech engine, and sent to a receiving end via a network after encoding. The speech finally received by a receiver in the game is clean, clear, and highly comprehensible.

Figure 16:
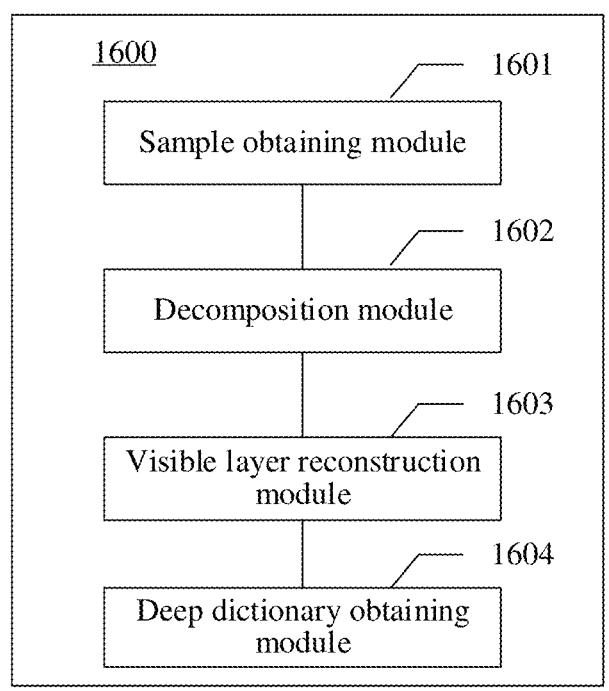
FIG. 16 is a block diagram of a speech enhancement apparatus according to an embodiment of this disclosure.

FIG. 16 is a block diagram of a speech enhancement apparatus according to an embodiment of this disclosure. Referring to FIG. 16, a speech enhancement apparatus 1600 provided in the embodiments of this disclosure may include: a sample obtaining module 1601, a decomposition module 1602, a visible layer reconstruction module 1603, and a deep dictionary obtaining module 1604.

The sample obtaining module 1601 may be configured to obtain a clean speech sample. The decomposition module 1602 may be configured to decompose the clean speech sample to obtain a first sparse matrix and m base matrices, values in the first sparse matrix being all positive numbers, and m being a positive integer greater than 1. The visible layer reconstruction module 1603 may be configured to obtain, according to the first sparse matrix and a weight matrix of a target neural network, state vectors of neurons in a visible layer of the target neural network. The deep dictionary obtaining module 1604 may be configured to update the weight matrix according to the state vectors of the neurons in the visible layer and the clean speech sample, to obtain a deep dictionary used for speech enhancement.

In some embodiments, the target neural network includes first bias terms.

In some embodiments, the visible layer reconstruction module 1603 may include: a visible layer conditional probability determining unit and a visible layer neuron state variable determining unit.

The visible layer conditional probability determining unit may be configured to determine visible layer conditional probabilities of the target neural network according to the first sparse matrix, the weight matrix of the target neural network, and the first bias terms; and the visible layer neuron state variable determining unit may be configured to determine state variables of the neurons in the visible layer according to the conditional probabilities of the visible layer.

In some embodiments, the target neural network further includes second bias terms.

In some embodiments, the deep dictionary obtaining module 1604 may include: a first conditional probability determining unit, a second conditional probability determining unit, and a weight update unit.

The first conditional probability determining unit may be configured to determine a first hidden layer conditional probability of the target neural network according to the weight matrix, the clean speech sample, and the second bias terms. The second conditional probability determining unit may be configured to determine a second hidden layer conditional probability of the target neural network according to the weight matrix, the state vectors of the neurons in the visible layer, and the second bias terms. The weight update unit may be configured to update the weight matrix according to the first hidden layer conditional probability, the second hidden layer conditional probability, the clean speech sample, and the state vectors of the neurons in the visible layer.

The deep dictionary obtaining module 1604 may further include: a first bias term update unit and a second bias term update unit.

The first bias term update unit may be configured to update the first bias terms according to the clean speech sample and the state vectors of the neurons in the visible layer. The second bias term update unit may be configured to update the second bias terms according to the first hidden layer conditional probability and the second hidden layer conditional probability.

In some embodiments, the m base matrices include a first base matrix and a second base matrix.

In some embodiments, the decomposition module 1602 may include: a first decomposition unit, a second decomposition unit, a base matrix variable determining unit, a first update unit, and a second update unit.

The first decomposition unit may be configured to perform semi non-negative matrix factorization on the clean speech sample, to determine the first base matrix and a first target matrix. The second decomposition unit may be configured to perform semi non-negative matrix factorization on the first target matrix, to initialize the second base matrix and a second target matrix. The base matrix variable determining unit may be configured to determine base matrix variables according to the first base matrix and the second base matrix. The first update unit may be configured to process the base matrix variables, the clean speech sample, and the second target matrix using a base matrix renewal function, to update the second base matrix. The second update unit may be configured to process the base matrix variables and the clean speech sample using a sparse matrix renewal function, to update the second target matrix, the second target matrix being the first sparse matrix.

The embodiments of this disclosure further provide another speech enhancement apparatus. The speech enhancement apparatus may include: a to-be-enhanced speech obtaining module, a deep dictionary determining module, a second sparse matrix obtaining module, and a clean speech obtaining module.

The to-be-enhanced speech obtaining module may be configured to obtain to-be-enhanced speech. The deep dictionary determining module may be configured to obtain, by using any one of the foregoing methods, a deep dictionary used for speech enhancement. The second sparse matrix obtaining module may be configured to perform deep expansion on the to-be-enhanced speech according to the deep dictionary, to determine a second sparse matrix of the to-be-enhanced speech. The clean speech obtaining module may be configured to determine clean speech of the to-be-enhanced speech according to the second sparse matrix and the deep dictionary.

In some embodiments, the second sparse matrix obtaining module may include: an initialization unit, a first soft threshold determining unit, and a second sparse matrix update unit.

The initialization unit may be configured to obtain the second sparse matrix of the to-be-enhanced speech. The first soft threshold determining unit may be configured to determine a first soft threshold according to the deep dictionary and the second sparse matrix. The second sparse matrix update unit may be configured to update the second sparse matrix according to the second sparse matrix, the deep dictionary, and the first soft threshold.

In some embodiments, the second sparse matrix obtaining module may include: a first speech for training obtaining unit, a first initialization unit, a first backpropagation unit, and a first determining unit.

The first speech for training obtaining unit may be configured to obtain first speech for training and a sparse matrix corresponding to the first speech for training. The first initialization unit may be configured to initialize the second sparse matrix of the to-be-enhanced speech. The first backpropagation unit may be configured to training a target feed forward neural network by using a backpropagation algorithm according to the first speech for training, the sparse matrix corresponding to the first speech for training, and the initialized second sparse matrix, to determine a first target parameter, a second target parameter, and a second soft threshold of the feed forward neural network. The first determining unit may be configured to process the to-be-enhanced speech according to the first target parameter, the second target parameter, and the second soft threshold of the feed forward neural network to determine the second sparse matrix of the to-be-enhanced speech.

In some embodiments, the second sparse matrix obtaining module may include: a second speech for training obtaining unit, a second initialization unit, a linear estimation unit determining unit, a minimum mean-square error estimation unit, a second backpropagation unit, and a second determining unit.

The second speech for training obtaining unit may be configured to obtain second speech for training and a sparse matrix corresponding to the second speech for training. The second initialization unit may be configured to obtain the second sparse matrix of the to-be-enhanced speech. The linear estimation unit determining unit may be configured to determine a linear estimation unit according to the deep dictionary, the second speech for training, and the sparse matrix corresponding to the second speech for training. The minimum mean-square error estimation unit may be configured to determine a minimum mean-square error estimation unit according to the deep dictionary and the second speech for training. The second backpropagation unit may be configured to process the second sparse matrix, the second speech for training, the sparse matrix corresponding to the second speech for training, the linear estimation unit, and the minimum mean-square error estimation unit by using a backpropagation algorithm, to determine target parameters in the linear estimation unit and the minimum mean-square error estimation unit. The second determining unit may be configured to process the to-be-enhanced speech according to the target parameters in the linear estimation unit and the minimum mean-square error estimation unit, to determine the clean speech of the to-be-enhanced speech.

In some embodiments, the second sparse matrix obtaining module further includes a Fourier transform unit. The Fourier transform unit may be configured to perform a Fourier transform on the to-be-enhanced speech, to obtain a first spectrogram of the to-be-enhanced speech, so as to perform deep expansion on the first spectrogram of the to-be-enhanced speech.

In some embodiments, the clean speech obtaining module may include: a phase information obtaining module, a second spectrogram obtaining unit, and a phase superimposition unit.

The phase information obtaining module may be configured to obtain phase information of the to-be-enhanced speech. The second spectrogram obtaining unit may be configured to determine a second spectrogram of the to-be-enhanced speech according to the second sparse matrix and the deep dictionary. The phase superimposition unit may be configured to superimpose the phase information and the second spectrogram, to obtain a second spectrogram including the phase information.

In some embodiments, the clean speech obtaining module may further include an inverse Fourier transform unit.

The inverse Fourier transform unit may be configured to perform an inverse Fourier transform on the second spectrogram comprising the phase information, to determine the clean speech of the to-be-enhanced speech.

Since each functional block of the speech enhancement apparatus according to the embodiments of this disclosure corresponds to each step of the exemplary embodiment of the speech enhancement method above, it is omitted for conciseness herein.

According to the foregoing descriptions of the implementations, a person skilled in the art may readily understand that the exemplary implementations described herein may be implemented by using software, or may be implemented by combining software and necessary hardware. Therefore, the technical solutions of the embodiments of this disclosure may be implemented in a form of a software product. The software product may be stored in a non-volatile storage medium (which may be a CD-ROM, a USB flash drive, a removable hard disk, or the like), including several instructions for instructing a computing device (which may be a personal computer, a server, a mobile terminal, a smart device, or the like) to perform the methods according to the embodiments of this disclosure, for example, one or more steps shown in FIG. 3.

In addition, the foregoing accompanying drawings are only schematic illustrations of the processing included in the method according to the exemplary embodiments of this disclosure, and are not intended for limitation. It is easily understood that the processes illustrated in the foregoing accompanying drawings do not indicate or define the chronological order of these processes. In addition, it is also easily understood that these processes may be performed, for example, synchronously or asynchronously in a plurality of modules.

What is claimed is:

1. A speech enhancement method, performed by an electronic device, the method comprising:
   obtaining a clean speech sample;
   decomposing the clean speech sample to obtain a first sparse matrix and m base matrices, values in the first sparse matrix being all positive numbers, and m being a positive integer greater than 1;
   obtaining, according to the first sparse matrix and a weight matrix of a target neural network, state vectors of neurons in a visible layer of the target neural network; and
   updating the weight matrix, according to the state vectors of the neurons in the visible layer and the clean speech sample, to obtain a deep dictionary used for speech enhancement.

2. The method according to claim 1, wherein the target neural network comprises first bias terms, and obtaining the state vectors of the neurons in the visible layer of the target neural network comprises:
   determining visible layer conditional probabilities of the target neural network according to the first sparse matrix, the weight matrix of the target neural network, and the first bias terms; and
   determining state variables of the neurons in the visible layer according to the conditional probabilities of the visible layer.

3. The method according to claim 2, wherein the target neural network further comprises second bias terms, and updating the weight matrix to obtain the deep dictionary used for the speech enhancement comprises:
   determining a first hidden layer conditional probability of the target neural network according to the weight matrix, the clean speech sample, and the second bias terms;
   determining a second hidden layer conditional probability of the target neural network according to the weight matrix, the state vectors of the neurons in the visible layer, and the second bias terms; and
   updating the weight matrix according to the first hidden layer conditional probability, the second hidden layer conditional probability, the clean speech sample, and the state vectors of the neurons in the visible layer.

4. The method according to claim 3, wherein updating the weight matrix to obtain the deep dictionary used for speech enhancement further comprises:
   updating the first bias terms according to the clean speech sample and the state vectors of the neurons in the visible layer; and
   updating the second bias terms according to the first hidden layer conditional probability and the second hidden layer conditional probability.

5. The method according to claim 1, wherein the m base matrices comprise a first base matrix and a second base matrix, and decomposing the clean speech sample to obtain the first sparse matrix and the m base matrices comprises:
   performing semi non-negative matrix factorization on the clean speech sample to determine the first base matrix and a first target matrix;
   performing semi non-negative matrix factorization on the first target matrix to initialize the second base matrix and a second target matrix;
   determining base matrix variables according to the first base matrix and the second base matrix;
   processing the base matrix variables, the clean speech sample, and the second target matrix, using a base matrix renewal function, to update the second base matrix; and
   processing the base matrix variables and the clean speech sample, using a sparse matrix renewal function, to update the second target matrix, the second target matrix being the first sparse matrix.

6. A speech enhancement method, performed by an electronic device, the method comprising:
   obtaining to-be-enhanced speech;
   performing the method according to claim 1, to obtain a deep dictionary used for speech enhancement;
   performing deep expansion on the to-be-enhanced speech according to the deep dictionary to determine a second sparse matrix of the to-be-enhanced speech; and
   determining clean speech of the to-be-enhanced speech according to the second sparse matrix and the deep dictionary.

7. The method according to claim 6, further comprising:
   obtaining the second sparse matrix of the to-be-enhanced speech;
   determining a first soft threshold according to the deep dictionary and the second sparse matrix; and
   updating the second sparse matrix according to the second sparse matrix, the deep dictionary, and the first soft threshold.

8. The method according to claim 6, wherein performing the deep expansion on the to-be-enhanced speech according to the deep dictionary to determine the second sparse matrix of the to-be-enhanced speech comprises:
   obtaining first speech for training and a sparse matrix corresponding to the first speech for training;
   initializing the second sparse matrix of the to-be-enhanced speech;
   training a target feed forward neural network by using a backpropagation algorithm according to the first speech for training, the sparse matrix corresponding to the first speech for training, and the initialized second sparse matrix to determine a first target parameter, a second target parameter, and a second soft threshold of the feed forward neural network; and
   processing the to-be-enhanced speech, according to the first target parameter, the second target parameter, and the second soft threshold of the feed forward neural network, to determine the second sparse matrix of the to-be-enhanced speech.

9. The method according to claim 6, wherein determining the clean speech of the to-be-enhanced speech comprises:
   obtaining second speech for training, a sparse matrix corresponding to the second speech for training, and the second sparse matrix of the to-be-enhanced speech;
   determining a linear estimation unit according to the second speech for training, the deep dictionary, and the second sparse matrix;
   determining a minimum mean-square error estimation unit according to the deep dictionary and the second speech for training;
   processing the linear estimation unit and the minimum mean-square error estimation unit by using a backpropagation algorithm to determine target parameters in the linear estimation unit and the minimum mean-square error estimation unit; and
   processing the to-be-enhanced speech according to the target parameters in the linear estimation unit and the minimum mean-square error estimation unit to determine the clean speech of the to-be-enhanced speech.

10. The method according to claim 6, wherein performing the deep expansion on the to-be-enhanced speech according to the deep dictionary to determine the second sparse matrix of the to-be-enhanced speech comprises:
performing a Fourier transform on the to-be-enhanced speech to obtain a first spectrogram of the to-be-enhanced speech; and
performing deep expansion on the first spectrogram of the to-be-enhanced speech according to the deep dictionary to determine the second sparse matrix of the to-be-enhanced speech.

11. The method according to claim 10, wherein determining the clean speech of the to-be-enhanced speech comprises:
obtaining phase information of the to-be-enhanced speech;
determining a second spectrogram of the to-be-enhanced speech according to the second sparse matrix and the deep dictionary;
superimposing the phase information and the second spectrogram to obtain a second spectrogram comprising the phase information; and
performing an inverse Fourier transform on the second spectrogram comprising the phase information to determine the clean speech of the to-be-enhanced speech.

12. An electronic device, comprising:
one or more processors; and
a memory, configured to store one or more programs,
the one or more programs, when executed by the one or more processors, causing the one or more processors to perform:
obtaining a clean speech sample;
decomposing the clean speech sample to obtain a first sparse matrix and m base matrices, values in the first sparse matrix being all positive numbers, and m being a positive integer greater than 1;
obtaining, according to the first sparse matrix and a weight matrix of a target neural network, state vectors of neurons in a visible layer of the target neural network; and updating the weight matrix, according to the state vectors of the neurons in the visible layer and the clean speech sample, to obtain a deep dictionary used for speech enhancement.

13. The electronic device of claim 12, wherein the target neural network comprises first bias terms, and obtaining the state vectors of the neurons in the visible layer of the target neural network comprises:
determining visible layer conditional probabilities of the target neural network according to the first sparse matrix, the weight matrix of the target neural network, and the first bias terms; and determining state variables of the neurons in the visible layer according to the conditional probabilities of the visible layer.

14. The electronic device of claim 13, wherein the target neural network further comprises second bias terms, and updating the weight matrix to obtain the deep dictionary used for the speech enhancement comprises:
determining a first hidden layer conditional probability of the target neural network according to the weight matrix, the clean speech sample, and the second bias terms;
determining a second hidden layer conditional probability of the target neural network according to the weight matrix, the state vectors of the neurons in the visible layer, and the second bias terms; and
updating the weight matrix according to the first hidden layer conditional probability, the second hidden layer conditional probability, the clean speech sample, and the state vectors of the neurons in the visible layer.

15. The electronic device of claim 14, wherein updating the weight matrix to obtain the deep dictionary used for speech enhancement further comprises:
updating the first bias terms according to the clean speech sample and the state vectors of the neurons in the visible layer; and
updating the second bias terms according to the first hidden layer conditional probability and the second hidden layer conditional probability.

16. The electronic device of claim 12, wherein the m base matrices comprise a first base matrix and a second base matrix, and decomposing the clean speech sample to obtain the first sparse matrix and the m base matrices comprises:
performing semi non-negative matrix factorization on the clean speech sample to determine the first base matrix and a first target matrix;
performing semi non-negative matrix factorization on the first target matrix to initialize the second base matrix and a second target matrix;
determining base matrix variables according to the first base matrix and the second base matrix;
processing the base matrix variables, the clean speech sample, and the second target matrix, using a base matrix renewal function, to update the second base matrix; and
processing the base matrix variables and the clean speech sample, using a sparse matrix renewal function, to update the second target matrix, the second target matrix being the first sparse matrix.

17. An electronic device, comprising:
one or more processors; and
a memory, configured to store one or more programs, the one or more programs, when executed by the one or more processors, causing the one or more processors to perform the method of claim 6.

18. The electronic device of claim 17, wherein the one or more programs, when executed by the one or more processors, further cause the one or more processors to perform:
obtaining the second sparse matrix of the to-be-enhanced speech;
determining a first soft threshold according to the deep dictionary and the second sparse matrix; and
updating the second sparse matrix according to the second sparse matrix, the deep dictionary, and the first soft threshold.

19. The electronic device of claim 17, wherein performing the deep expansion on the to-be-enhanced speech according to the deep dictionary to determine the second sparse matrix of the to-be-enhanced speech comprises:
obtaining first speech for training and a sparse matrix corresponding to the first speech for training;
initializing the second sparse matrix of the to-be-enhanced speech;
training a target feed forward neural network by using a backpropagation algorithm according to the first speech for training, the sparse matrix corresponding to the first speech for training, and the initialized second sparse matrix to determine a first target parameter, a second target parameter, and a second soft threshold of the feed forward neural network; and
processing the to-be-enhanced speech, according to the first target parameter, the second target parameter, and the second soft threshold of the feed forward neural network, to determine the second sparse matrix of the to-be-enhanced speech.

20. The electronic device of claim 17, wherein determining the clean speech of the to-be-enhanced speech comprises:
- obtaining second speech for training, a sparse matrix corresponding to the second speech for training, and the second sparse matrix of the to-be-enhanced speech;
- determining a linear estimation unit according to the second speech for training, the deep dictionary, and the second sparse matrix;
- determining a minimum mean-square error estimation unit according to the deep dictionary and the second speech for training;
- processing the linear estimation unit and the minimum mean-square error estimation unit by using a back-propagation algorithm to determine target parameters in the linear estimation unit and the minimum mean-square error estimation unit; and
- processing the to-be-enhanced speech according to the target parameters in the linear estimation unit and the minimum mean-square error estimation unit to determine the clean speech of the to-be-enhanced speech.

\* \* \* \* \*